(12) United States Patent
Yoshida et al.

(10) Patent No.: US 11,876,574 B2
(45) Date of Patent: Jan. 16, 2024

(54) POWER WIRING NETWORK APPARATUS

(71) Applicant: ZEON CORPORATION, Tokyo (JP)

(72) Inventors: Masayoshi Yoshida, Tokyo (JP); Naomi Shiga, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 729 days.

(21) Appl. No.: 16/982,041

(22) PCT Filed: Mar. 15, 2019

(86) PCT No.: PCT/JP2019/010965
§ 371 (c)(1),
(2) Date: Sep. 18, 2020

(87) PCT Pub. No.: WO2019/188448
PCT Pub. Date: Oct. 3, 2019

(65) Prior Publication Data
US 2021/0021304 A1    Jan. 21, 2021

(30) Foreign Application Priority Data

Mar. 30, 2018 (JP) ................................. 2018-069085

(51) Int. Cl.
*H04B 3/54* (2006.01)
*H02J 13/00* (2006.01)

(52) U.S. Cl.
CPC ........ *H04B 3/542* (2013.01); *H02J 13/00002* (2020.01); *H02J 13/00006* (2020.01)

(58) Field of Classification Search
CPC .......... H04B 3/542; H04B 3/548; H04B 3/54; H02J 13/00002; H02J 13/00006;
(Continued)

(56) References Cited

U.S. PATENT DOCUMENTS

2011/0031814 A1  2/2011 Giesler
2011/0084553 A1  4/2011 Adest et al.
(Continued)

FOREIGN PATENT DOCUMENTS

CN      107078502 A    8/2017
EP      2725678 A1    4/2014
(Continued)

OTHER PUBLICATIONS

Jun. 21, 2023, Communication pursuant to Article 94(3) EPC issued by the European Patent Office in the corresponding European Patent Application No. 19774465.9.
(Continued)

*Primary Examiner* — Fitwi Y Hailegiorgis
(74) *Attorney, Agent, or Firm* — KENJA IP LAW PC

(57) ABSTRACT

The present disclosure aims to provide a power wiring network apparatus capable of constructing a highly portable power wiring network, without the need to maintain infrastructure. A power wiring network apparatus of the present disclosure includes circuit elements each including a first connector, a second connector, and a conductive portion electrically connecting the first connector and the second connector. The circuit elements include energy harvesting elements as circuit elements capable of outputting power generated by energy harvesting and load elements as circuit elements capable of consuming inputted power. The circuit elements are mechanically and electrically attachable via the first connector and second connector. At least some energy harvesting elements and load elements are capable of power line data communication via a power line including the first connector, second connector, and conductive portion.

20 Claims, 22 Drawing Sheets

(58) Field of Classification Search
CPC . H02J 13/00022; H02J 50/001; H04L 5/0048; H04L 27/2671; Y04S 40/126; Y04S 40/12; Y04S 40/121; Y02E 60/00
USPC .......................................................... 375/257
See application file for complete search history.

(56) References Cited

U.S. PATENT DOCUMENTS

| | | | |
|---|---|---|---|
| 2012/0160297 A1 | 6/2012 | Yamakawa et al. | |
| 2015/0063473 A1* | 3/2015 | Nishibayashi | H02J 13/00 375/257 |
| 2017/0222436 A1* | 8/2017 | Wendt | H02J 1/08 |
| 2021/0099107 A1* | 4/2021 | Yoshida | H04L 7/0008 |

FOREIGN PATENT DOCUMENTS

| | | |
|---|---|---|
| JP | 2012205078 A | 10/2012 |
| JP | 2016054617 A | 4/2016 |
| JP | 2017127190 A | 7/2017 |

OTHER PUBLICATIONS

May 28, 2019, International Search Report issued in the International Patent Application No. PCT/JP2019/010965.
Feb. 27, 2023, Communication pursuant to Article 94(3) EPC issued by the European Patent Office in the corresponding European Patent Application No. 19774465.9.
Oct. 6, 2020, International Preliminary Report on Patentability issued in the International Patent Application No. PCT/JP2019/010965.
Nov. 26, 2021, the Extended European Search Report issued by the European Patent Office in the corresponding European Patent Application No. 19774465.9.

* cited by examiner

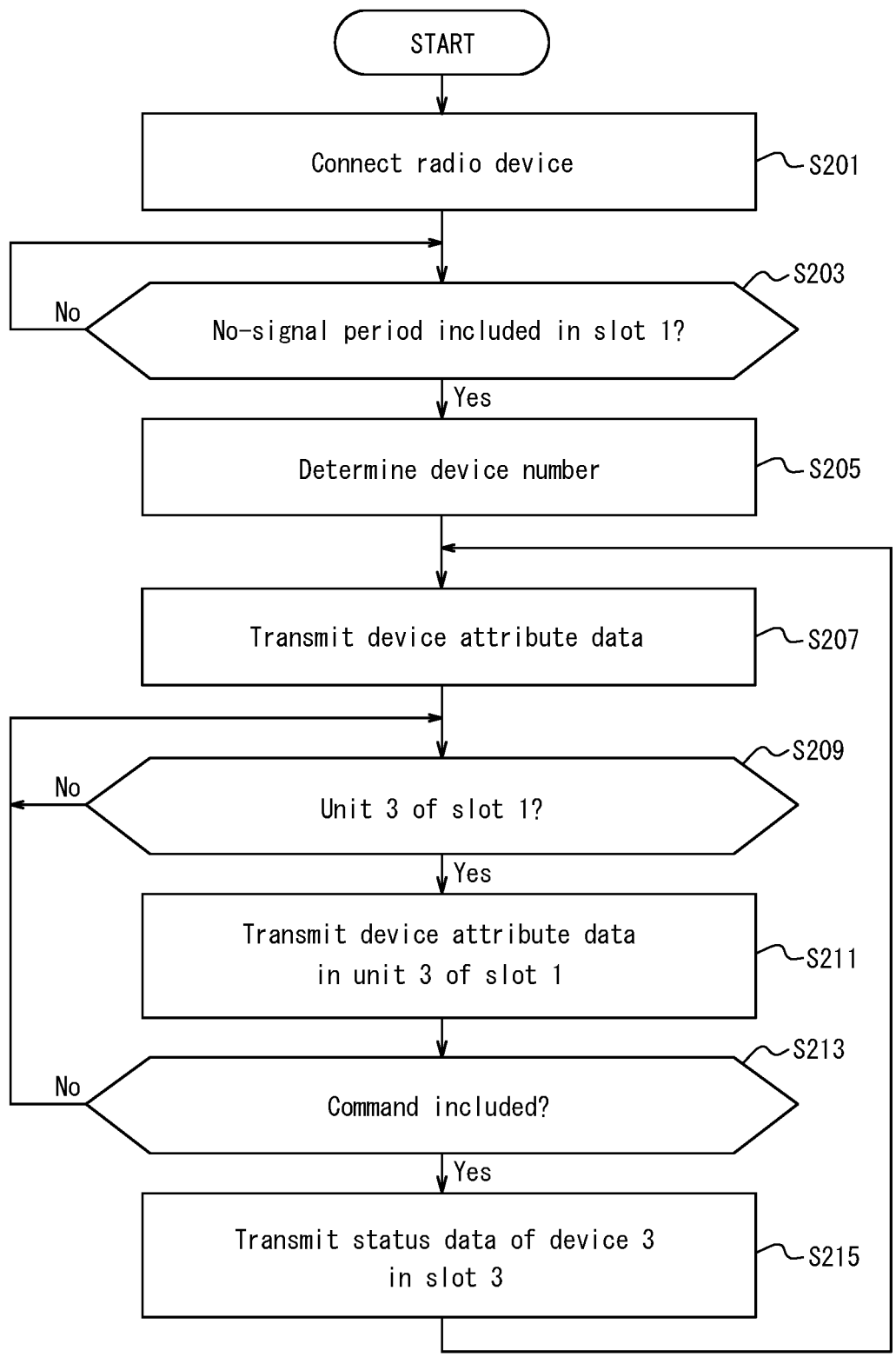

POWER WIRING NETWORK APPARATUS

CROSS-REFERENCE TO RELATED APPLICATION

The present application claims priority to and the benefit of Japanese Patent Application No. 2018-69085 filed Mar. 30, 2018, the entire contents of which are incorporated herein by reference.

TECHNICAL FIELD

The present disclosure relates to a power wiring network apparatus.

BACKGROUND

In recent years, progress has been made in developing a communication method for transmitting a high frequency signal as a communication signal over a power line. For example, patent literature (PTL) 1 discloses a solar power generation monitoring system for use in a solar power generation system that aggregates and sends the output from a plurality of solar cell panels to a power conversion apparatus. In the monitoring system, a power line communication function is implemented by a lower-level communication apparatus that transmits measurement data from a measurement apparatus for measuring the power generation of solar cell panels and an upper-level communication apparatus that receives the measurement data transmitted by the lower-level communication apparatus.

CITATION LIST

Patent Literature

PTL 1: JP 2012-205078 A

SUMMARY

Technical Problem

In the system disclosed in PTL 1, however, the communication apparatuses need to be connected to the power line of the solar power generation system, i.e. to the infrastructure. The portability of a device is therefore impaired if the device is to perform power line communication, making the system inconvenient.

The present disclosure therefore aims to resolve the above-described problem and provide a power wiring network apparatus capable of constructing a power network with excellent portability, without the need to maintain infrastructure.

Solution to Problem

The present disclosure aims to resolve the aforementioned problem advantageously. A power wiring network apparatus of the present disclosure includes a plurality of circuit elements each including a first connector, a second connector, and a conductive portion electrically connecting the first connector and the second connector in a manner capable of supplying power. The plurality of circuit elements include an energy harvesting element as a circuit element capable of outputting, from the first connector and/or the second connector, power generated by energy harvesting; and a load element as a circuit element capable of consuming power inputted from the first connector and/or the second connector. The plurality of circuit elements are mechanically and electrically attachable and detachable via the first connector and the second connector. At least some of the energy harvesting elements and the load elements are capable of power line data communication via a power line including the first connector, the second connector, and the conductive portion. This configuration enables the construction of a power wiring network with excellent portability, without the need to maintain infrastructure.

In the power wiring network apparatus of the present disclosure, the energy harvesting element preferably includes a first transmitter configured to transmit data via the first connector and/or the second connector. This configuration enables another circuit element to be notified, via the first transmitter, that the energy harvesting element is connected to the network. Furthermore, the state of the energy harvesting element can be transmitted to another circuit element, enabling efficient use of the power generated by the energy harvesting element.

In the power wiring network apparatus of the present disclosure, at least one load element preferably includes a second transmitter configured to transmit data via the first connector and/or the second connector and/or includes a receiver configured to receive data. This configuration enables another circuit element to be notified, via the second transmitter, that the load element is connected to the network. Furthermore, the load element can receive a command via the receiver, enabling the user to operate the load element by power line communication.

In the power wiring network apparatus of the present disclosure, the first transmitter or the second transmitter is preferably capable of transmitting a signal yielded by digital modulation of transmission data to another circuit element by superimposing the signal on the power line via the first connector and/or the second connector. This configuration enables high-speed communication using a power wiring network.

In the power wiring network apparatus of the present disclosure, the receiver is preferably configured to receive, via the first connector and/or the second connector, a signal yielded by digital modulation and superimposed on the power line and is preferably configured to demodulate the signal and generate received data. This configuration enables high-speed communication using a power wiring network.

In the power wiring network apparatus of the present disclosure, at least one load element is preferably capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present. This configuration enables a network management device to easily detect a circuit element in the network.

In the power wiring network apparatus of the present disclosure, the energy harvesting element or the load element is preferably configured to receive the synchronization signal and to transmit the notification signal of the energy harvesting element or the load element to another circuit element during a predetermined period based on the synchronization signal when the energy harvesting element or the load element detects no signal during the predetermined period. This configuration enables stable communication in accordance with current conditions when a circuit element is added during operation of the network. Furthermore, when a circuit element is removed during operation of the network, the network management device can easily detect the removal of the circuit element.

In the power wiring network apparatus of the present disclosure, the notification signal preferably includes attribute data of the energy harvesting element or the load element, and the attribute data is preferably fixed-length modulation data. This configuration enables each circuit element to occupy a no-signal period of a fixed length, detected after receipt of the synchronization signal, as the circuit element's own fixed-length attribute data transmission period.

In the power wiring network apparatus of the present disclosure, at least one load element is preferably configured to transmit variable length data including control information of the energy harvesting element or the load element. This configuration enables efficient sharing of the power line communication environment among a plurality of circuit elements.

In the power wiring network apparatus of the present disclosure, at least one energy harvesting element or load element is preferably configured to transmit variable length data including status information of the at least one energy harvesting element or load element. This configuration enables efficient sharing of the power line communication environment among a plurality of circuit elements.

In the power wiring network apparatus of the present disclosure, the circuit elements preferably include a switching element capable of switching between electrical connection to and disconnection from another plurality of circuit elements. This configuration enables power lines to be separated into a plurality of local networks or integrated into one network. Accordingly, an entire local network can be added to another network. Furthermore, a plurality of local networks can be continually AC coupled, thereby enabling DC power to be cut off between the local networks by the switching element while network communication is enabled between the local networks.

In the power wiring network apparatus of the present disclosure, the switching element preferably includes a second transmitter configured to transmit data and/or a receiver configured to receive data. This configuration enables another circuit element to be notified, via the second transmitter, that the switching element is connected to the network. Furthermore, the switching element can receive a command via the receiver, enabling the user to operate the switching element by power line communication.

In the power wiring network apparatus of the present disclosure, the load element capable of generating the synchronization signal is preferably further capable of wireless communication by Bluetooth® (Bluetooth is a registered trademark in Japan, other countries, or both). This configuration enables a user to use circuit elements, which are connected to a power wiring network, by communicating wirelessly with a network management device from an external device such as a smartphone.

Advantageous Effect

The present disclosure can provide a power wiring network apparatus capable of constructing a power wiring network with excellent portability, without the need to maintain infrastructure.

BRIEF DESCRIPTION OF THE DRAWINGS

In the accompanying drawings:

FIG. 23B is a flowchart illustrating transmission and reception of data in a radio device (device 3) in a power wiring network apparatus according to an embodiment of the present disclosure.

DETAILED DESCRIPTION

Embodiments of the present disclosure are described below with reference to the drawings. Common components in each drawing are labeled with the same reference sign.

[Configuration of Energy Harvesting Element 60]

Figure 1:
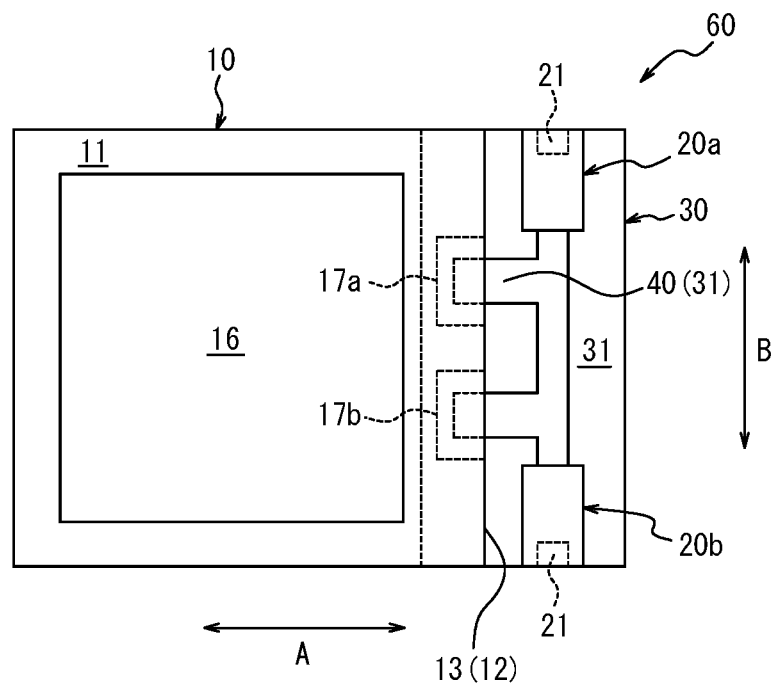
FIG. 1 is a plan view of an energy harvesting element used in a power wiring network apparatus according to an embodiment of the present disclosure.
Figure 2:
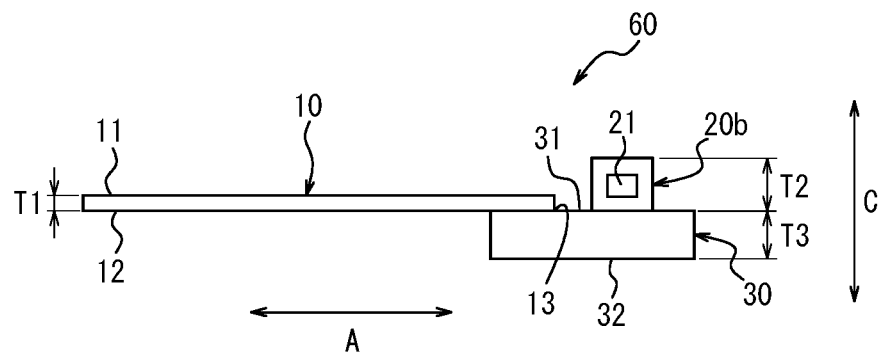
FIG. 2 is a front view of the energy harvesting element illustrated in FIG. 1.

FIG. 1 is a plan view of an energy harvesting element 60 used in a power wiring network apparatus 1 according to an embodiment of the present disclosure. FIG. 2 is a front view of the energy harvesting element 60. As illustrated in FIG. 1 and FIG. 2, the energy harvesting element 60 includes an energy harvesting unit 10, a connector 20, a rigid member 30, and a conductive portion 40. The connector 20 of the present embodiment includes a first connector 20a and a second connector 20b. In FIG. 1, the shape of each component in the energy harvesting element 60 is prescribed for the sake of explanation, but the actual shapes of components are not limited to these shapes. This also applies to each of the drawings described below.

The energy harvesting unit 10 generates power in accordance with the external environment. In other words, the power generated by the energy harvesting unit 10 changes depending on the external environment. The energy harvesting unit 10 includes a solar cell, for example, that generates power using light energy such as sunlight or room light. The energy harvesting unit 10 may, for example, include a thermoelectric conversion element that generates power using thermal energy such as geothermal energy.

The energy harvesting unit 10 of the present embodiment includes a solar cell panel 16 formed by a solar cell. The solar cell panel 16 is a member including a solar cell that photoelectrically converts incident light such as sunlight, room light, or the like and outputs electric power. The types of solar cells included in the solar cell panel 16 are roughly classified into inorganic solar cells in which an inorganic material is used and organic solar cells in which an organic material is used. Examples of inorganic solar cells include silicon (Si) solar cells in which silicon is used and compound solar cells in which a compound is used. Examples of organic solar cells include thin-film solar cells such as low-molecular weight vapor deposition-type solar cells in which an organic pigment is used, polymer coating-type solar cells in which a conductive polymer is used, and coating-conversion-type solar cells in which a conversion-type semiconductor is used; and dye-sensitized solar cells formed from titania, an organic dye, and an electrolyte. Solar cells included in the solar cell panel 16 can also include organic/inorganic hybrid solar cells and solar cells in which a perovskite compound is used. The solar cell panel 16 may be a thin panel. In this case, it is preferable to use a dye-sensitized solar cell, fabricated on a plastic film or the like, which is easy to form as a thin mold. When the solar cell panel 16 is a thin panel, the solar cell panel is not limited to one fabricated on the aforementioned plastic film or the like; any mode is applicable as long as it is similarly thin. The thickness of the solar cell panel 16 formed as a thin panel is preferably 10 μm or more to 3 mm or less, for example, from the perspective of manufacturing techniques.

As illustrated in FIGS. 1 and 2, the energy harvesting unit 10 is a flexible plate-shaped member. The energy harvesting unit 10 of the present embodiment is rectangular in the plan view of FIG. 1. In the energy harvesting unit 10, the solar cell panel 16 is arranged so that incident light from a front surface 11 strikes the solar cell panel 16. The energy harvesting unit 10 includes an extraction electrode 17 positioned at an edge 13 of a back surface 12. The extraction electrode 17 of the present embodiment includes a first extraction electrode 17a and a second extraction electrode 17b. The first extraction electrode 17a and the second extraction electrode 17b are arranged at positions separated from each other along the edge 13. The energy harvesting unit 10 outputs generated electric power from the first extraction electrode 17a and the second extraction electrode 17b.

The first extraction electrode 17a and the second extraction electrode 17b are not particularly limited and each include a conductive body formed by a typical conductive material. Examples of such a conductive body include conductive bodies formed from a metal material such as copper, aluminum, gold, silver, nickel, or iron; an alloy material including metal alloys of these metal materials; and conductive adhesive. Among these materials, the conductive body of the first extraction electrode 17a and the second extraction electrode 17b is preferably a metal foil, and electrodes having copper foil as the conductive body are particularly preferable. In the present disclosure, "metal foil" refers to metal shaped as a foil with a thickness of 300 μm or less.

The first connector 20a and the second connector 20b each include a connecting portion 21. The first connector 20a and the second connector 20b are each mechanically and electrically connectable to an external connector S1 (see FIG. 4) via the corresponding connecting portion 21. The external connector S1 is a connector provided in a connection cable 50 (see FIG. 4) or the like external to the energy harvesting element 60. The first connector 20a and the second connector 20b of the present embodiment are attachable to and detachable from the external connector S1 via the corresponding connecting portion 21.

The first connector 20a and the second connector 20b may be female connectors or male connectors. In other words, the connecting portion 21 of each of the first connector 20a and the second connector 20b may be a female connector or a male connector. One of the first connector 20a and the second connector 20b may be a female connector, and the other a male connector. In this case, the first connector 20a and the second connector 20b of adjacent circuit elements can be connected directly without the connection cable 50 therebetween. To make the energy harvesting element 60 more compact, both of the first connector 20a and the second connector 20b are preferably female connectors, as illustrated in FIG. 1. To make the power wiring network apparatus 1 more compact overall, however, the first connector 20a and the second connector 20b are preferably connectable directly.

The rigid member 30 is a flat plate-shaped member. The rigid member 30 of the present embodiment is rectangular in the plan view of FIG. 1. The conductive portion 40 forms a portion of a front surface 31 of the rigid member 30. The rigid member 30 may be a rigid substrate in which the conductive portion 40 is formed integrally on the front surface 31. Use of a rigid substrate, with the conductive portion 40 formed therein, as the rigid member 30 enables simplification of the manufacturing step to arrange the conductive portion 40 in the rigid member 30. The conductive portion 40 may be a printed circuit board that forms a portion of the front surface 31 by covering a portion of the rigid member 30. When the conductive portion 40 is a printed circuit board, a flexible wiring board is preferably used for thinness and to simplify the manufacturing process.

The rigid member 30 is formed from resin, metal, or another rigid material. As described below, at least a portion of the rigid member 30 may be transparent. The material in this case may be a transparent resin, glass, or the like. Transparent resin is preferably used to reduce weight. Examples of transparent resin include acrylic resin, cycloolefin polymer (COP) resin, polycarbonate, styrene resin, polyester, cellulose resin, and polyolefin.

The positional relationship between the members included in the energy harvesting element 60 is now described. As illustrated in FIGS. 1 and 2, an edge 13 of a back surface 12 of the energy harvesting unit 10 is disposed on the front surface 31 of the rigid member 30. In other words, the energy harvesting unit 10 and the rigid member 30 partially overlap, with the back surface 12 of the energy harvesting unit 10 and the front surface 31 of the rigid member 30 facing each other. The first extraction electrode 17a and the second extraction electrode 17b of the energy harvesting unit 10 each come into contact with and are electrically connected to the conductive portion 40 that forms a portion of the front surface 31 of the rigid member 30. Details on the circuit configuration of the energy harvesting element 60 are provided below.

As illustrated in FIG. 1, the first connector 20a and the second connector 20b are disposed on the front surface 31 of the rigid member 30 at locations separated from the energy harvesting unit 10. The first connector 20a and the second connector 20b each come into contact with and are electrically connected to the conductive portion 40. In this way, the first connector 20a and the second connector 20b are each electrically connected to the energy harvesting unit 10 via the conductive portion 40. As described above, the energy harvesting unit 10 is disposed at a location separated from the first connector 20a and the second connector 20b via the rigid member 30. Therefore, the stress on the energy harvesting unit 10 when the first connector 20a or the second connector 20b is attached to or detached from the external connector S1 (see FIG. 4) can be relieved.

Figure 3:
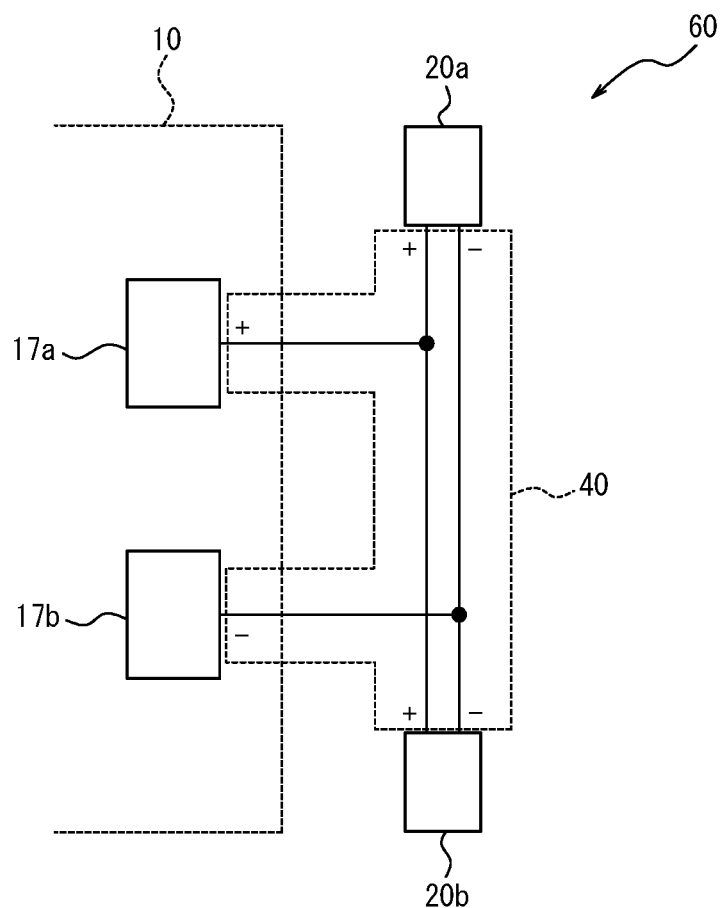
FIG. 3 is a schematic view of the circuit configuration of the energy harvesting element illustrated in FIG. 1.

In the present embodiment, the first connector 20a, the second connector 20b, and the conductive portion 40 form a power line capable of power supply between the energy harvesting element 60 and another circuit element. In the present embodiment, a two-wire system that includes a positive electrode and a negative electrode, as illustrated in FIG. 3, is used. This configuration is not, however, limiting.

The energy harvesting unit 10 and the rigid member 30 are bonded to each other by a bonding material such as adhesive, pressure sensitive adhesive, or the like. As described below, at least a portion of the energy harvesting element 60 may be transparent. If a transparent bonding material such as transparent adhesive is used as the bonding material in this case, the joint between the energy harvesting unit 10 and the rigid member 30 can be formed to be transparent. The first connector 20a and the second connector 20b are each joined to the conductive portion 40 by solder or the like.

The first connector 20a and the second connector 20b are disposed at positions separated in a second direction B in plan view of the energy harvesting unit 10 illustrated in FIG. 1. Here, the second direction B is a direction intersecting a first direction A in the plan view illustrated in FIG. 1. The first direction A is the direction in which the energy harvesting unit 10 is positioned relative to the rigid member 30 in the plan view illustrated in FIG. 1. The first connector 20a and the second connector 20b are each connectable to the external connector S1 along the second direction B. An edge, in the second direction B, of the connecting portion 21 of each of the first connector 20a and the second connector 20b in the present embodiment is at the same position as an edge of the rigid member 30 in the plan view illustrated in FIG. 1.

As illustrated in FIG. 2, the energy harvesting unit 10 is arranged on the front surface 31 of the rigid member 30 without overlapping with the first connector 20a and the second connector 20b also arranged on the front surface 31. Accordingly, the thickness of the energy harvesting element 60 overall can be reduced. In greater detail, a thickness T1 of the energy harvesting unit 10 is less than a thickness T2 of the first connector 20a and the second connector 20b. The thickness of the energy harvesting element 60 is therefore T2+T3, i.e. the sum of the thickness T2 of the first connector 20a and the second connector 20b and a thickness T3 of the rigid member 30.

The energy harvesting unit 10, first connector 20a, and second connector 20b are all arranged on the same front surface 31 side of the rigid member 30. Hence, when a shock is received from an external source, for example, the first connector 20a and the second connector 20b absorb a portion of the shock if the shock comes from the front surface 31 side, and the rigid member 30 absorbs a portion of the shock if the shock comes from back surface 32 side. Accordingly, the shock to the energy harvesting unit 10 can be reduced. In particular, the thickness T2 of the first connector 20a and the second connector 20b is greater than the thickness T1 of the energy harvesting unit 10. The first connector 20a and the second connector 20b can therefore absorb a greater portion of a shock from the front surface 31 side, further reducing the shock to the energy harvesting unit 10.

The thickness T1 of energy harvesting unit 10 is preferably 3 mm or less, for example, from the perspective of manufacturing techniques. The thickness T1 of the energy harvesting unit 10 preferably has a lower limit of approximately 10 μm.

FIG. 3 is a schematic view of the circuit configuration of the energy harvesting element 60. As illustrated in FIG. 3, the first extraction electrode 17a is the positive electrode of the energy harvesting unit 10. The second extraction electrode 17b is the negative electrode of the energy harvesting unit 10. The conductive portion 40 connects the first extraction electrode 17a electrically to the positive electrode of each of the first connector 20a and the second connector 20b. The conductive portion 40 connects the second extraction electrode 17b electrically to the negative electrode of each of the first connector 20a and the second connector 20b. In other words, the first connector 20 a can electrically connect to the first extraction electrode 17a and the second extraction electrode 17b via the conductive portion 40. The second connector 20b can also electrically connect to the first extraction electrode 17a and the second extraction electrode 17b via the conductive portion 40.

[Configuration of Connection Cable 50]

Figure 4:
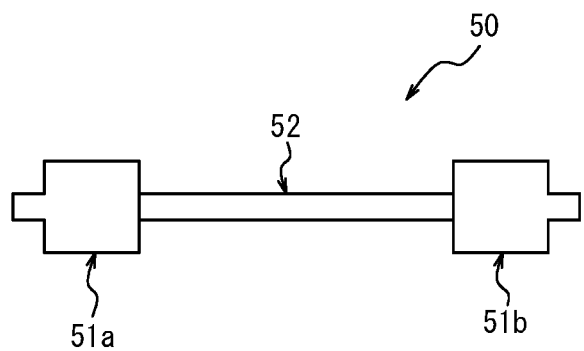
FIG. 4 illustrates a connection cable provided with external connectors capable of connecting to the first connector and the second connector illustrated in FIG. 1.

FIG. 4 illustrates the connection cable 50, which includes external connectors S1 capable of connecting to the first connector 20a and the second connector 20b. The connection cable 50 includes a conductive member 52 in the shape of a cable and two external connectors S1, i.e. a first external connector 51a and second external connector 51b, positioned at the ends of the conductive member 52. The connection cable 50 can electrically connect the energy harvesting element 60 with another apparatus by connecting one of the first external connector 51a and the second external connector 51b (here, the first external connector 51a) to the first connector 20a or the second connector 20b and the other (here, the second external connector S1 b) to a connector of the other apparatus. In this case, the first external connector S1 a is a type of connector corresponding to the first connector 20a or the second connector 20b to which the first external connector 51a is to be connected. In other words, the first external connector S1 a that connects to the first connector 20a or the second connector 20b is a male connector in the case of connection to a female connector and is a female connector in the case of connection to a male connector. Similarly, the second external connector 51b is a type of connector corresponding to the connector of the other apparatus to which the second external connector 51b is to be connected. The first external connector 51a and the second external connector 51b may be the same type of connector or different types of connectors. When configured as the same type of connector, the first external connector 51a and the second external connector 51b can connect the energy harvesting element 60 to another apparatus without regard to the orientation of the connection cable 50. The other apparatus connected to the connection cable 50 may, for example, be another energy harvesting element 60 configured similarly to the energy harvesting element 60. The other apparatus may also be a predetermined load element 70 that is the recipient of power supplied from the energy harvesting element 60.

[Configuration of Power Wiring Network Apparatus 1]

Figure 5:
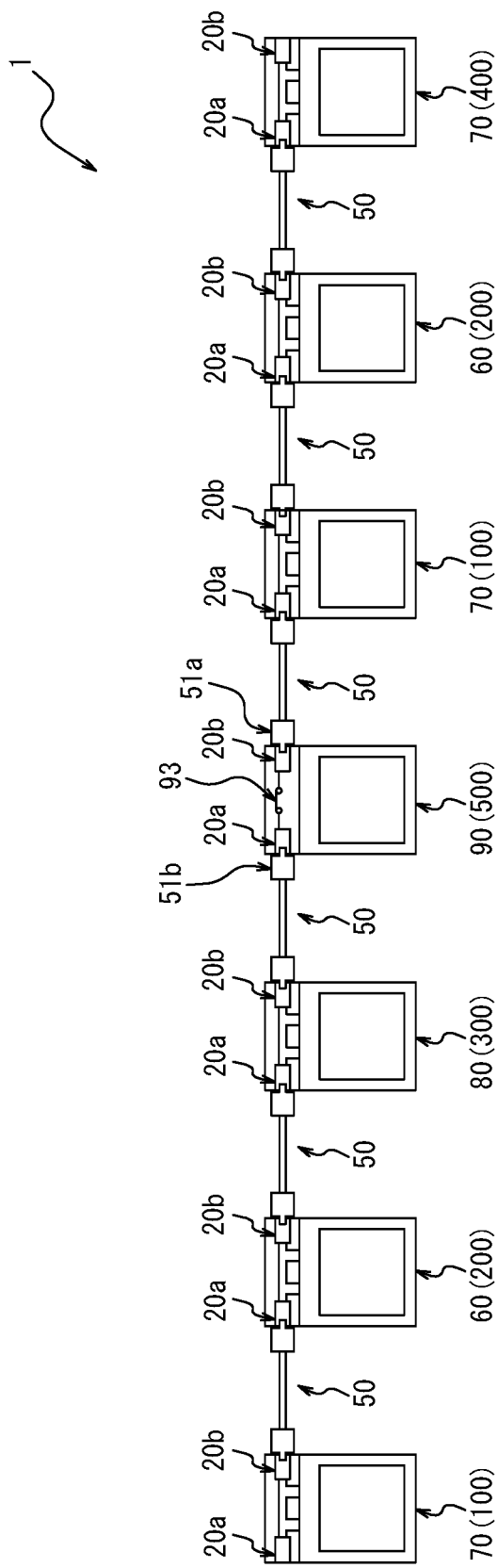
FIG. 5 is a schematic view of a power wiring network apparatus according to an embodiment of the present disclosure.

FIG. 5 is a schematic diagram of the power wiring network apparatus 1 according to an embodiment of the present disclosure. As illustrated in FIG. 5, the power wiring network apparatus 1 includes a plurality of circuit elements, each including the first connector 20a and the second connector 20b, that are connected to be mechanically and electrically attachable to and detachable from each other via the connection cable 50. In the example of FIG. 5, the first connector 20a, the second connector 20b, the conductive portion 40, and the connection cable 50 form a power line capable of power supply between the circuit elements. The power line may, however, be configured without including the connection cable 50. In other words, the plurality of circuit elements may be connected directly to each other without use of the connection cable 50. The power wiring network apparatus 1 according to the present embodiment includes the energy harvesting element 60, the load element 70, a secondary battery element 80, and a switching element 90 as the plurality of circuit elements. In the example of FIG. 5, three load elements 70, two energy harvesting elements 60, one secondary battery element 80, and one switching element 90 are connected by the connection, via the connection cable 50, between the first connector 20a and the second connector 20b that face each other in adjacent circuit elements. The switching element 90 disposed in the center in the left-right direction of FIG. 5 has a function of switching, by operation of a switch 93, between electrically connecting and disconnecting the first connector 20a and the second connector 20b provided respectively at the left and right edges of the switching element 90. The detailed configuration of the switching element 90 is described below.

In the present disclosure, "mechanically and electrically attachable and detachable" refers to one being attachable to the other and being detachable after attachment. In a state in which one is attached to the other, the two are mechanically and electrically connected to each other. In a state in which one is detached from the other, the two are mechanically and electrically disconnected from each other.

FIG. 5 illustrates one aspect of the power wiring network apparatus 1 according to the present embodiment. It suffices for the plurality of circuit elements to include at least the energy harvesting element 60 and the load element 70. The plurality of circuit elements may be connected via the connection cables 50, as illustrated in FIG. 5, or the first connector 20a and the second connector 20b may be connected directly. When the first connector 20a and the second connector 20b are connected directly, one is a male connector, and the other is a female connector. The circuit elements are connected electrically in parallel.

Figure 6A:
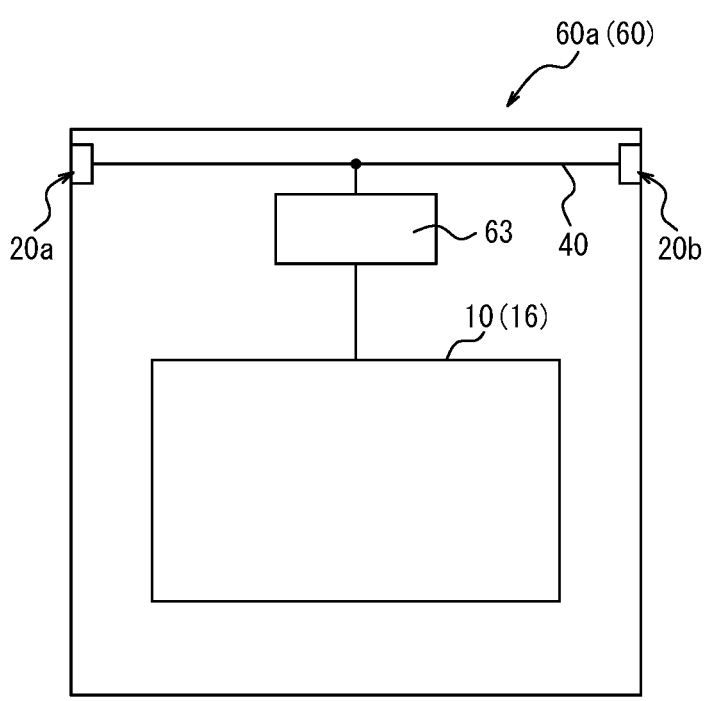
FIG. 6A is a schematic view of a first configuration example of an energy harvesting element as a circuit element included in the power wiring network apparatus illustrated in FIG. 5.
Figure 6B:
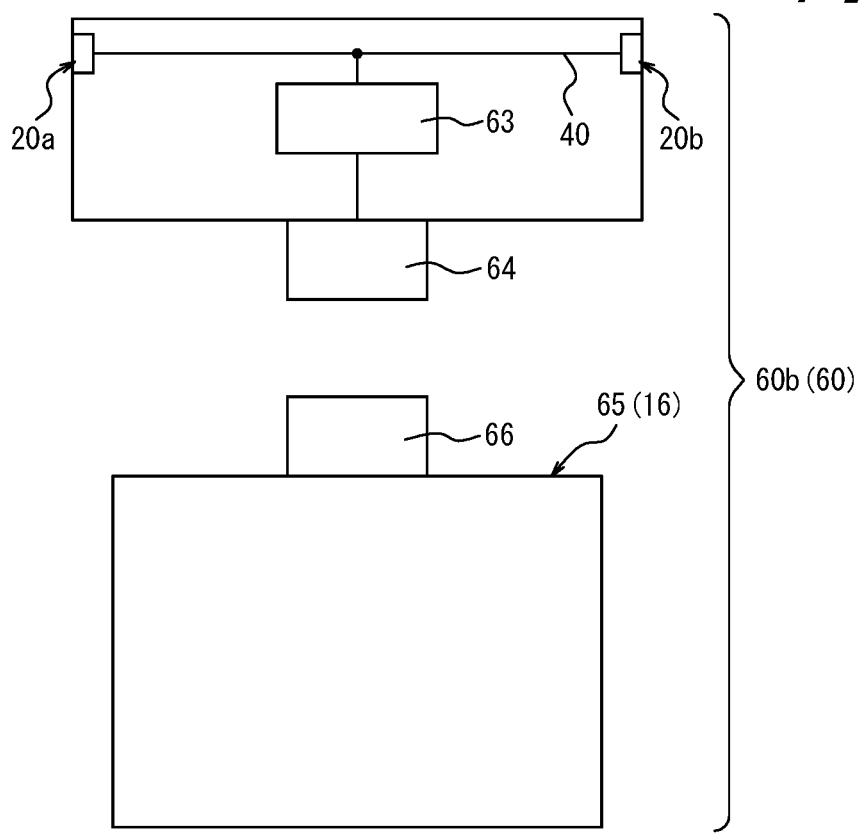
FIG. 6B is a schematic view of a second configuration example of an energy harvesting element as a circuit element included in the power wiring network apparatus illustrated in FIG. 5.

FIGS. 6A and 6B are schematic views of configuration examples of the energy harvesting element 60 as a circuit element included in the power wiring network apparatus 1. Specifically, FIG. 6A is a schematic view of an energy harvesting element 60a as a first configuration example of the energy harvesting element 60. FIG. 6B is a schematic view of an energy harvesting element 60b as a second configuration example of the energy harvesting element 60.

As illustrated in FIG. 6A, the energy harvesting element 60a as a first configuration example of the energy harvesting element 60 includes the first connector 20a, the second connector 20b, a reverse current prevention unit 63, the conductive portion 40 that electrically connects these components, and the energy harvesting unit 10. The reverse current prevention unit 63 and the energy harvesting unit 10 are electrically connected via electrical wiring. The electrical connection between the first connector 20a or the second connector 20b and the reverse current prevention unit 63 and the electrical connection between the reverse current prevention unit 63 and the energy harvesting unit 10 may be a direct connection, without the use of electrical wiring.

The energy harvesting unit 10 is capable of generating power by energy harvesting. The energy harvesting unit 10 outputs the generated power to the first connector 20a and/or the second connector 20b via the reverse current prevention unit 63.

The reverse current prevention unit 63 prevents current from the first connector 20a and/or the second connector 20b from flowing into the energy harvesting unit 10. The reverse current prevention unit 63 can include a circuit element such as a diode. When a diode is used as the reverse current prevention unit 63, the diode is connected so that the anode is on the energy harvesting unit 10 side, and the cathode is on the first connector 20a and the second connector 20b side. The collector and the base terminals of a transistor may be connected and paired with the emitter for use as a diode in the reverse current prevention unit 63.

As illustrated in FIG. 6B, the energy harvesting element 60b as the second configuration example of the energy harvesting element 60 includes the reverse current prevention unit 63 and a connector 64 for power generator connection, in addition to the above-described first connector 20a and second connector 20b. Whereas the energy harvesting element 60 a includes the energy harvesting unit 10, the energy harvesting element 60b differs by not including the energy harvesting unit 10.

The reverse current prevention unit 63 included in the energy harvesting element 60b suppresses the flow of current from the first connector 20a and the second connector 20b into the connector 64 for power generator connection. The remaining configuration is similar to that of the above-described reverse current prevention unit 63 included in the energy harvesting element 60a.

The connector 64 for power generator connection is a connector capable of mechanically and electrically connecting to an external energy harvesting unit 65. The connector 64 for power generator connection may be mechanically and electrically attachable to and detachable from the external energy harvesting unit 65. The connector 64 for power generator connection is not restricted, and a typical connector can be used. A connector conforming to a predetermined standard, such as a connector using a universal serial bus (USB) interface, can also be used.

Apart from including a connector 66, the external energy harvesting unit 65 has a similar configuration to that of the energy harvesting unit 10 included in the above-described energy harvesting element 60a. The connector 66 is a connector capable of mechanically and electrically connecting to the connector 64 for power generator connection. Like the connector 64 for power generator connection, the connector 66 is not restricted.

Like the energy harvesting element 60 illustrated in FIG. 1, the load element 70 includes the first connector 20a and the second connector 20b. The load element 70 is capable of consuming power inputted from the first connector 20a and/or the second connector 20b. As in the energy harvesting element 60, the first connector 20a and the second connector 20b are mechanically and electrically attachable to and detachable from the second external connector 51b and the first external connector 51a of the connection cable 50. The power wiring network apparatus 1 may include a plurality of load elements 70, as illustrated in FIG. 5. When a plurality of load elements 70 is included, the power consumption of each load element 70 may differ.

Figure 7A:
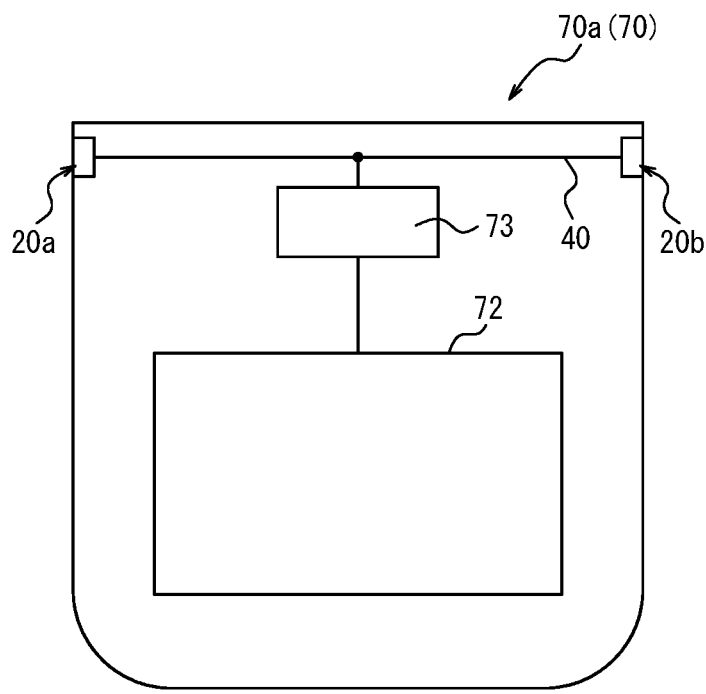
FIG. 7A is a schematic view of a first configuration example of a load element as a circuit element included in the power wiring network apparatus illustrated in FIG. 5.
Figure 7B:
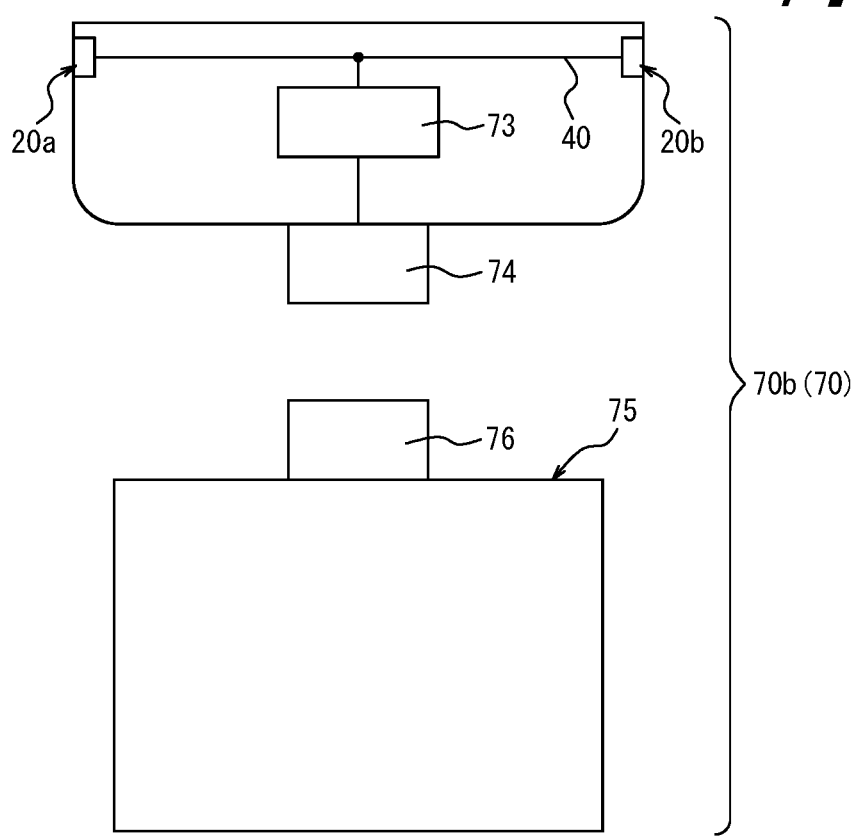
FIG. 7B is a schematic view of a second configuration example of a load element as a circuit element included in the power wiring network apparatus illustrated in FIG. 5.

FIGS. 7A and 7B are schematic views of configuration examples of the load element 70 as a circuit element included in the power wiring network apparatus 1. Specifically, FIG. 7A is a schematic view of a load element 70a as a first configuration example of the load element 70. FIG. 7B is a schematic view of a load element 70b as a second configuration example of the load element 70.

As illustrated in FIG. 7A, the load element 70a as the first configuration example of the load element 70 includes the conductive portion 40, a load 72, and a voltage controller 73 in addition to the above-described first connector 20a and second connector 20b. The first connector 20a, the second connector 20b, and the voltage controller 73 are electrically connected to each other via the conductive portion 40. The voltage controller 73 and the load 72 are electrically connected to each other via electrical wiring. The electrical connection between the first connector 20a or the second connector 20b and the voltage controller 73 and the electrical connection between the voltage controller 73 and the load 72 may be a direct connection, without the use of electrical wiring.

The load 72 may be any load capable of consuming power. The load 72 may, for example, be an electronic device, such as a radio; an LED light; or the like. The power consumed by the load 72 may change depending on factors such as the drive state of the load 72.

The voltage controller 73 controls the power inputted from the first connector 20a and/or the second connector 20b to be a predetermined voltage and outputs the result to the load 72. In greater detail, the voltage controller 73 steps down or steps up the power inputted from the first connector 20a and/or the second connector 20b to a predetermined voltage suitable for driving the load 72, such as the rated voltage of the load 72, and outputs the result to the load 72.

As illustrated in FIG. 7B, the load element 70b as the second configuration example of the load element 70 includes the conductive portion 40, the voltage controller 73, and a connector 74 for load connection in addition to the above-described first connector 20a and second connector 20b.

The voltage controller 73 included in the load element 70b controls the power inputted from the first connector 20a and/or the second connector 20b to be a predetermined voltage and outputs the result to the connector 74 for load connection. In greater detail, the voltage controller 73 steps down or steps up the power inputted from the first connector 20a and/or the second connector 20b to a predetermined voltage such as the rated voltage according to the standards for the connector 74 for load connection and outputs the result to the connector 74 for load connection.

The connector 74 for load connection is a connector capable of mechanically and electrically connecting to an external load 75. The connector 74 for load connection may be mechanically and electrically attachable to and detachable from the external load 75. The connector 74 for load connection is not restricted and may be a connector conforming to a predetermined standard, such as a connector using a USB interface.

Apart from including a connector 76, the external load 75 has a similar configuration to that of the load 72 included in the above-described load element 70a. The connector 76 is a connector capable of mechanically and electrically connecting to the connector 74 for load connection. Like the connector 74 for load connection, the connector 76 is not restricted and may be a connector conforming to a predetermined standard, such as a connector using a USB interface. It suffices for the external load 75 to be capable of connecting, via the connector 76, to the connector 74 for load connection. The external load 75 may be a typical electronic device, such as a smartphone, a mobile phone, or a personal computer (PC).

Figure 8:
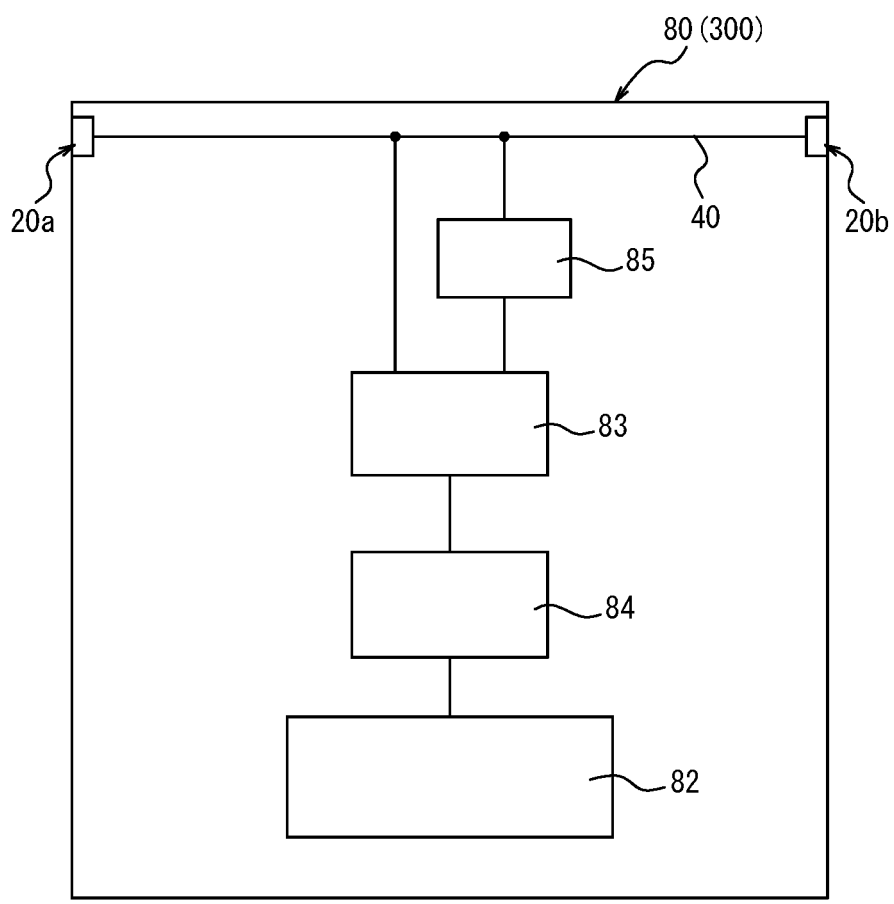
FIG. 8 is a schematic view of a configuration example of a secondary battery element as a circuit element included in the power wiring network apparatus illustrated in FIG. 5.

The power wiring network apparatus 1 may further include a secondary battery element 80 as a circuit element. FIG. 8 is a schematic view of a configuration example of the secondary battery element 80 as a circuit element included in the power wiring network apparatus 1.

As illustrated in FIG. 8, the secondary battery element 80 includes the first connector 20a and the second connector 20b. Like their counterparts included in the energy harvesting element 60 and the load element 70, the first connector 20a and the second connector 20b are mechanically and electrically attachable to and detachable from the second external connector 51b and the first external connector 51a of the connection cable 50. The power wiring network apparatus 1 may include a plurality of secondary battery elements 80. When a plurality of secondary battery elements 80 is included, the input electric power during charging and the output electric power during power supply may differ between the secondary battery elements 80.

As illustrated in FIG. 8, the secondary battery element 80 includes the conductive portion 40, a secondary battery 82, a switch 83, a voltage controller 84, and a reverse current prevention unit 85 in addition to the above-described first connector 20a and second connector 20b.

The secondary battery 82 is capable of being charged and discharged. Examples of the secondary battery 82 include a lithium ion battery and a nickel-hydrogen battery.

The switch 83 is capable of switching between a charging state of charging the secondary battery 82 with power inputted from the first connector 20a and/or the second connector 20b and a power supply state of outputting, from the first connector 20a and/or the second connector 20b, power from the secondary battery 82. The switch 83 includes a switching element, for example, located between and electrically connected to the connectors (first connector 20a and second connector 20b) and the secondary battery 82.

The voltage controller 84 controls the power inputted from the first connector 20a and/or the second connector 20b to be a predetermined voltage and outputs the result to the secondary battery 82. In greater detail, the voltage controller 84 steps down or steps up the power inputted from the first connector 20a and/or the second connector 20b to a predetermined voltage suitable for charging the secondary battery 82, such as the rated voltage of the secondary battery 82, and outputs the result to the secondary battery 82. The voltage controller 84 also controls the power inputted from the secondary battery 82 to be a predetermined voltage and outputs the result to the first connector 20a and/or the second connector 20b. In greater detail, the voltage controller steps down or steps up the power inputted from the secondary battery 82 to a predetermined voltage suitable for another circuit element, such as the load element 70, and outputs the result to the first connector 20a and/or the second connector 20b. The voltage controller 84 is located between and electrically connected to the switch 83 and the secondary battery 82.

When the switch 83 is in the power supply state, the reverse current prevention unit 85 suppresses current from the first connector 20a and the second connector 20b from flowing into the secondary battery 82. The reverse current prevention unit 85 can include a circuit element such as a diode. When a diode is used as the reverse current prevention unit 85, the diode is connected so that the anode is on the secondary battery 82 side, and the cathode is on the first connector 20a and the second connector 20b side. The reverse current prevention unit 85 is positioned on the wiring so as to be conductive when the switch 83 is in the power supply state and not to be conductive when the switch 83 is in the charging state.

When the power wiring network apparatus 1 includes a secondary battery element 80 in this way, power can be supplied to the load element 70 stably by switching between the charging state and the power supply state of the secondary battery element 80 depending on conditions. For example, the secondary battery element 80 may be placed in the power supply state when power supply to the load element 70 is insufficient and be placed in the charging state when power supply to the load element 70 is sufficient.

The switching element 90 includes the first connector 20a, the second connector 20b, and the switch 93. The first connector 20a and the second connector 20b in the present embodiment are provided at the left and right edges of the switching element 90 in FIG. 5. By the first connector 20 a being connected to the second external connector 51b of the connection cable 50 and the second connector 20b being connected to the first external connector 51a of the connection cable 50, the circuit elements disposed on the left and right of the switching element 90 of FIG. 5 can be switched between being electrically connected and disconnected.

In other words, the switch 93 can switch the first connector 20a and the second connector 20b between being electrically connected and disconnected. The switch 93 includes a switching element, for example, located between and electrically connected to the first connector 20a and the second connector 20b. The switch 93 may, for example, be configured so that between the first connector 20a and the second connector 20b, an electrical connection for supplying DC power is switched between a connected and disconnected state, whereas an electrical connection for signal transmission by AC power (i.e. a C-connection or the like) is continuously maintained.

When a plurality of circuit elements are mechanically connected via the switching element 90 as in the present embodiment, the plurality of circuit elements can be switched between being electrically connected to and disconnected from each other by switching of the switch 93 in the switching element 90. Accordingly, when power is to be supplied preferentially to the load element 70 connected on the right side of the switching element 90 of FIG. 5, for example, the switch 93 can be disconnected when the power supply of the energy harvesting element 60 connected on the right side of the switching element 90 is sufficient. Power is then supplied to the load element 70 from the energy harvesting element 60 connected on the right side of the switching element 90. When the power supply of the energy harvesting element 60 connected on the right side of the switching element 90 is insufficient, the switch 93 can be connected. Power can then be supplied to the load element 70 connected on the right side of the switching element 90 from the energy harvesting element 60 and the secondary battery element 80 connected on the left side of the switching element 90. In accordance with the generated power of the energy harvesting element 60, power can thus be supplied on a priority basis to the load element 70 with a high priority for power supply. By the switch 93 being disconnected, the energy harvesting element 60 and the load element 70 can be arranged for each circuit element on the left and right of the switching element 90. A plurality of independent systems can be configured with any number of energy harvesting elements 60 and any number of load elements 70 combined in each system.

In the present embodiment, circuit elements are basically arranged to be collinear, as illustrated in FIG. 5, by the first connector 20a and the second connector 20b that face each other in adjacent circuit elements being connected by the connection cable 50, or by the first connector 20a and the second connector 20b being directly connected. Connection of a plurality of circuit elements in this way enables the circuit elements to be arranged in an orderly manner, which facilitates carrying and storage of the power wiring network apparatus 1.

Next, power line communication for data communication via the power line formed by the conductive portion 40, the first connector 20a, and the second connector 20b of the circuit element is described. In the example of FIG. 5, the load element 70 (network management device 100) connected to the left and right of the switching element 90 is a circuit element for network management of the power wiring network apparatus 1. This circuit element includes a controller 101 configured by a central processing unit (CPU)

or the like and functions as a network management device 100 configured as a load element 70 that receives power supplied from the power line.

Figure 9:
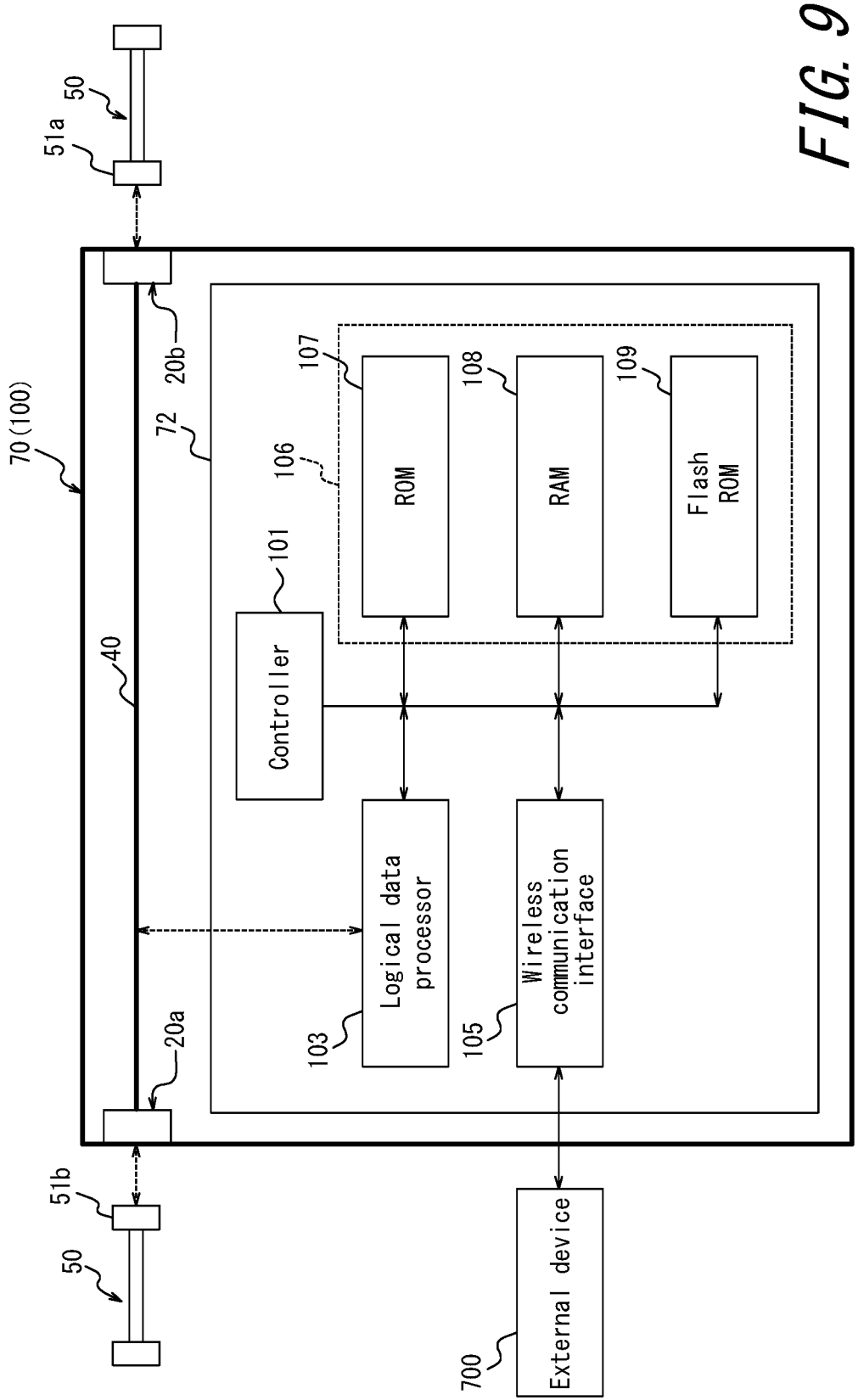
FIG. 9 is a schematic view of a configuration example of a network management device as a load element included in the power wiring network apparatus illustrated in FIG. 5.

FIG. 9 is a block diagram illustrating the configuration of the network management device 100 as a load element 70. The network management device 100 includes a controller 101 that controls the device overall, a logical data processor 103 that processes data transmitted and received to and from the power line, a wireless communication interface 105 for communicating with an external device 700 wirelessly, such as by Bluetooth® or Wi-Fi® (Wi-Fi is a registered trademark in Japan, other countries, or both), and a storage 106 that includes a read-only memory (ROM) 107, a random access memory (RAM) 108, and a rewritable flash ROM 109. The controller 101, the logical data processor 103, the wireless communication interface 105, and the storage 106 operate by receiving power supplied from the voltage controller 73 (see FIG. 7A), not illustrated in FIG. 9. In other words, the controller 101, the logical data processor 103, the wireless communication interface 105, and the storage 106 constitute the load 72 in FIG. 7A.

The controller 101 controls the logical data processor 103, the wireless communication interface 105, the storage 106, and the like, as described below. The controller 101 can be configured by one or more CPUs, application specific integrated circuits (ASICs), digital signal processors (DSPs), programmable logic devices (PLDs), field programmable gate arrays (FPGAs), microcontrollers, or the like.

The logical data processor 103 executes processing such as transmission and reception of data via the power line and generation of synchronization signals S1 to S4 for transmission and reception of data. The configuration of the logical data processor 103 is described in further detail below.

Figure 10:
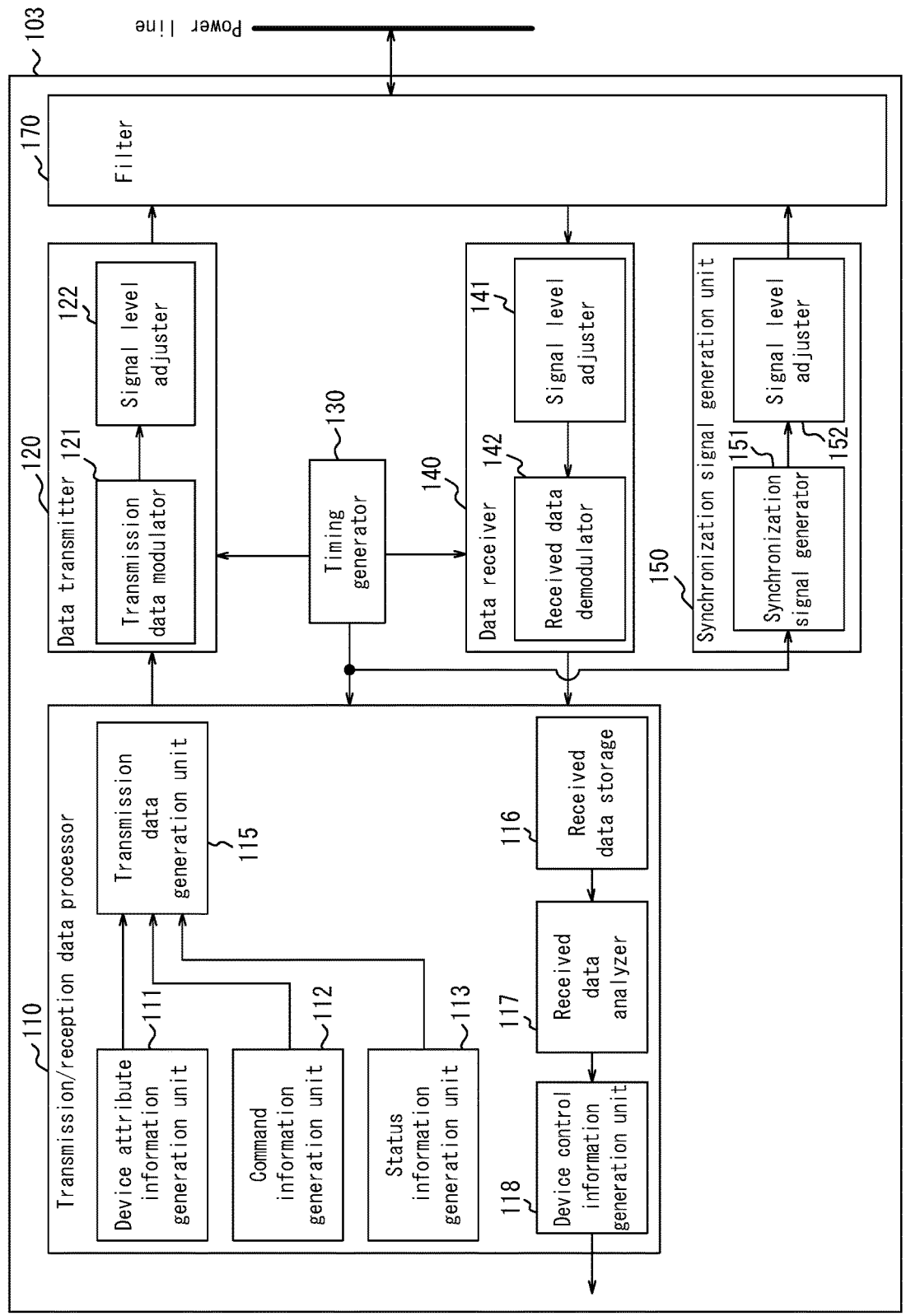
FIG. 10 is a schematic view of a configuration example of a logical data processor included in the network management device illustrated in FIG. 9.

FIG. 10 is a block diagram illustrating the configuration of the logical data processor 103. The logical data processor 103 includes a filter 170 for removing the DC component from electric power that includes a data signal supplied via the power line, a data receiver 140 for receiving and demodulating the data signal from which the DC component was removed to generate received data, a data transmitter 120 for modulating transmission data to generate a data signal to superimpose on the power line, a transmission/reception data processor 110 for performing signal processing on the received data and for generating transmission data, a timing generator 130 for generating a timing signal and the like for generation of the synchronization signals S1 to S4, and a synchronization signal generation unit 150 for generating the synchronization signals S1 to S4 that determine the transmission timing of transmission data and the like.

The filter 170 has the function of removing the DC component from electric power that includes a data signal supplied via the power line. The filter 170 can, for example, be configured as a "C-connection" that connects the power line with the data receiver 140 and the data transmitter 190 using a capacitor. In addition to being configured in this way as a high pass filter using a passive element, the filter 170 may be configured as a bandpass filter that only transmits signals in a particular band or be configured to include an active element such as an operational amplifier or a transistor.

The data receiver 140 receives and demodulates the data signal from which the DC component was removed, thereby generating received data. The data receiver 140 includes a signal level adjuster 141 for adjusting the signal level and a received data demodulator 142 for demodulating the signal, after level adjustment, to generate the received data.

The signal level adjuster 141 adjusts the signal amplitude so that the signal level of the data signal, from the power line, filtered by the filter 170 to include only the AC component falls within a predetermined range. The signal level adjuster 141 can be implemented by an automatic gain control circuit capable of adjusting the gain to be within a range suitable for the input signal level by feeding back the maximum signal level, for example. The received data demodulator 142 reads the level-adjusted data signal based on a timing signal from the timing generator 130 and demodulates the data signal that was modulated by another circuit element back to the original signal. The data signal may be demodulated by dedicated hardware or by software processing by the controller 101 or the like.

The data transmitter 120 modulates the transmission data generated by the transmission/reception data processor 110 and superimposes the modulated transmission data on the power line via the filter 170. The data transmitter 120 includes a transmission data modulator 121 for modulating transmission data using a predetermined modulation method and a signal level adjuster 122 for adjusting the signal level.

The transmission data modulator 121 digitally modulates the transmission data, generated by the transmission/reception data processor 110, using a predetermined modulation method. Orthogonal frequency division multiplexing (OFDM), spread spectrum (SS), or the like can be used as the modulation format, although these examples are not limiting. The transmission data modulator 121 outputs the modulated transmission data at an appropriate timing based on the timing signal from the timing generator 130 to input the modulated transmission data to the signal level adjuster 122. The signal level adjuster 122 adjusts the signal amplitude of the transmission data, modulated by the transmission data modulator 121, so that the signal level is suitable for superimposition on the power line.

The transmission/reception data processor 110 processes the received data received by the data receiver 140 and generates the transmission data that serves as the basis for the data signal to be superimposed on the power line by the data transmitter 120. The transmission/reception data processor 110 includes a received data storage 116, a received data analyzer 117, and a device control information generation unit 118 as functional components for processing the received data. The transmission/reception data processor 110 includes a device attribute information generation unit 111, a command information generation unit 112, a status information generation unit 113, and a transmission data generation unit 115 as functional components for processing the transmission data.

The received data demodulated by the data receiver 140 is stored in the received data storage 116 as necessary. The received data storage 116 may be configured as a dedicated storage for received data or as a partial area inside the RAM 108 of the storage 106, for example.

The data stored in the received data storage 116 is analyzed by the received data analyzer 117. The received data is analyzed by determining whether the received data is attribute information, command information, or status information from another circuit element. When the received data is attribute information, the received data is analyzed by identifying the device that transmitted the attribute information, parameters of the attribute information, and the like. When the received data is command information, the received data is analyzed by identifying the device that transmitted the command information, the type of command ("command code" in Table 2), parameters, and the like. When the received data is status information, the received data is analyzed by identifying the device that transmitted the status information, the type of status ("status code" in Table 3), parameters, and the like. The received data may be analyzed by dedicated hardware or by software processing by the controller 101 or the like.

The result of analysis of the received data by the received data analyzer 117 is processed by the device control information generation unit 118. For example, when the result of analysis of the received data is status information of a radio device 400, described below, the device control information generation unit 118 transmits the status information of the radio device 400 to the external device 700, such as a smartphone, via Bluetooth communication by the wireless communication interface 105. Consequently, by receiving the status information from the radio device 400, the user of the external device 700 can confirm whether operations by the user have been reflected in the state of the radio device 400.

The transmission/reception data processor 110 includes the device attribute information generation unit 111, the command information generation unit 112, the status information generation unit 113, and the transmission data generation unit 115 as functional components for processing the transmission data. The below-described transmission data processing may be implemented by hardware or by software processing by the controller 101 or the like.

The device attribute information generation unit 111 is a functional component for generating device attribute information in the format of the transmission data. The device attribute information is the device manufacturer, the device type, a device identifier, device characteristics, and the like. The device attribute information can, for example, be generated by reading related information from the ROM 107 and converting the related information to the format of the transmission data as necessary.

The command information generation unit 112 is a functional component for generating command information in the format of the transmission data. The command information includes information with a recipient device number, a command code, a command parameter, and the like. The command information generation unit 112 receives a command issued in response to user operation on an application executed by the external device 700, such as a smartphone. The command information generation unit 112 receives the command by Bluetooth communication and generates a power line communication command corresponding to the received command. For example, when the user performs an operation on the external device 700 to raise the volume of the radio, the command information generation unit 112 can, for example, generate a command to raise the volume of the radio for the radio device 400 (disposed at the right edge of the switching element 90 in FIG. 5) corresponding to the command, received by Bluetooth communication, to raise the volume of the radio. The radio device 400 is one of the load elements 70 managed by the network management device 100.

The status information generation unit 113 is a functional component for generating status information in the format of the transmission data. The status information includes information with a transmission device number, a status code, a status parameter, and the like. The status information generation unit 113 generates status information indicating that, for example, the network management device 100 has successfully received the attribute data of another circuit element (energy harvesting element 60, load element 70, or the like).

Based on a timing signal from the timing generator 130, described below, the transmission data generation unit 115 outputs the transmission data, generated by each of the device attribute information generation unit 111, the command information generation unit 112, and the status information generation unit 113, in an appropriate order and at an appropriate timing to input the transmission data to the data transmitter 120.

The synchronization signal generation unit 150 includes a synchronization signal generator 1S1 for generating the synchronization signals S1 to S4 based on the timing signal from the timing generator 130 and a signal level adjuster 152 for adjusting the signal amplitude so that the signal level of the synchronization signals S1 to S4 outputted from the synchronization signal generator 1S1 is suitable for superimposition on the power line.

Figure 11:
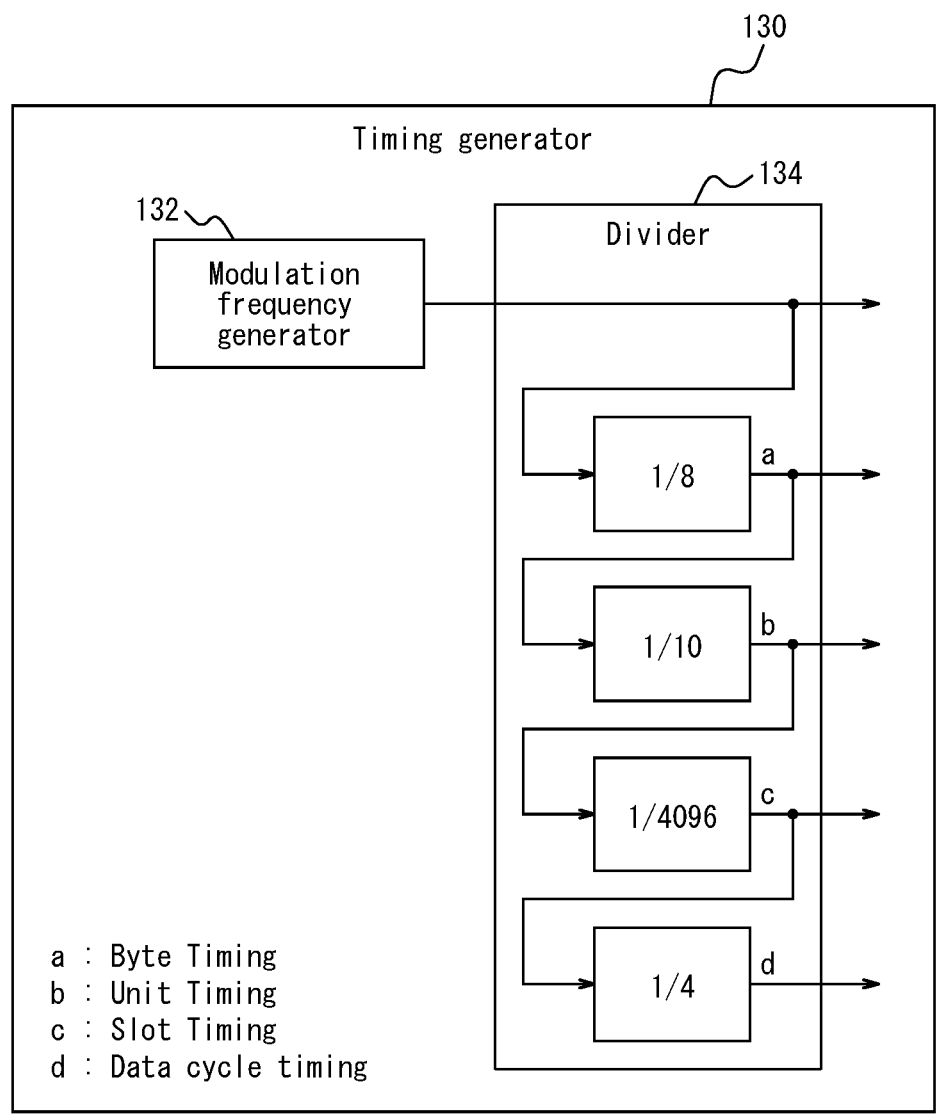
FIG. 11 is a schematic view of a configuration example of a timing generator included in the logical data processor illustrated in FIG. 10.

FIG. 11 is a block diagram illustrating the configuration of the timing generator 130. The timing generator 130 includes a modulation frequency generator 132 for generating a modulated wave modulated at a predetermined frequency and a frequency divider 134 for dividing the modulated wave from the modulation frequency generator 132 at a predetermined dividing ratio to obtain various timing signals.

In the present embodiment, the cycle of the modulated wave outputted by the modulation frequency generator 132 corresponds to a period of one bit. Accordingly, one cycle of a timing signal a obtained by dividing the modulated wave from the modulation frequency generator 132 by eight corresponds to the period of one byte. One cycle of a timing signal b obtained by dividing the timing signal a by 10 corresponds to the period of one unit configured to have a length of 10 bytes, as described below. One cycle of a timing signal c obtained by further dividing the timing signal b by 4096 corresponds to the period of one slot configured to have a length of 4096 units, as described below. One cycle of a timing signal d obtained by further dividing the timing signal c by four corresponds to the period of one data cycle configured to have a length of four slots, as described below. The frequency of the modulated wave outputted by the modulation frequency generator 132 can, for example, be 100 kHz (the period of one bit thus becoming 0.01 msec), but this configuration is not limiting. The synchronization signal generator 1S1 illustrated in FIG. 10 generates pulses (synchronization signals S1 to S4), with a length of one unit, that rise synchronously with the slot timing signal (timing signal c) outputted by the timing generator 130.

The modulated wave outputted by the modulation frequency generator 132 may be generated by dedicated hardware or be generated from a reference clock such as the CPU constituting the controller 101.

The wireless communication interface 105 has the function of performing wireless communication conforming to a wireless communication standard such as Bluetooth or Wi-Fi. The wireless communication interface 105 communicates with the external device 700, such as a smartphone or tablet PC, and transmits a power line communication command, corresponding to a command received from the external device 700, to another device managed by the network management device 100. The wireless communication interface 105 can also transmit status information received from the other device to the external device 700.

The storage 106 includes the ROM 107, the RAM 108, the rewritable, programmable flash ROM 109, and the like. The ROM 107 and the flash ROM 109 are both read-only memories, but the flash ROM 109 is writable and can store information such as programs to be executed by the CPU.

The RAM 108 is a backup memory and is configured by dynamic random access memory (DRAM) or the like. The RAM 108 may include a volatile memory or non-volatile memory other than DRAM. The network management device 100 may be configured to include only a portion of the storage 106 illustrated in FIG. 9 or not to include the storage 106.

Figure 12:
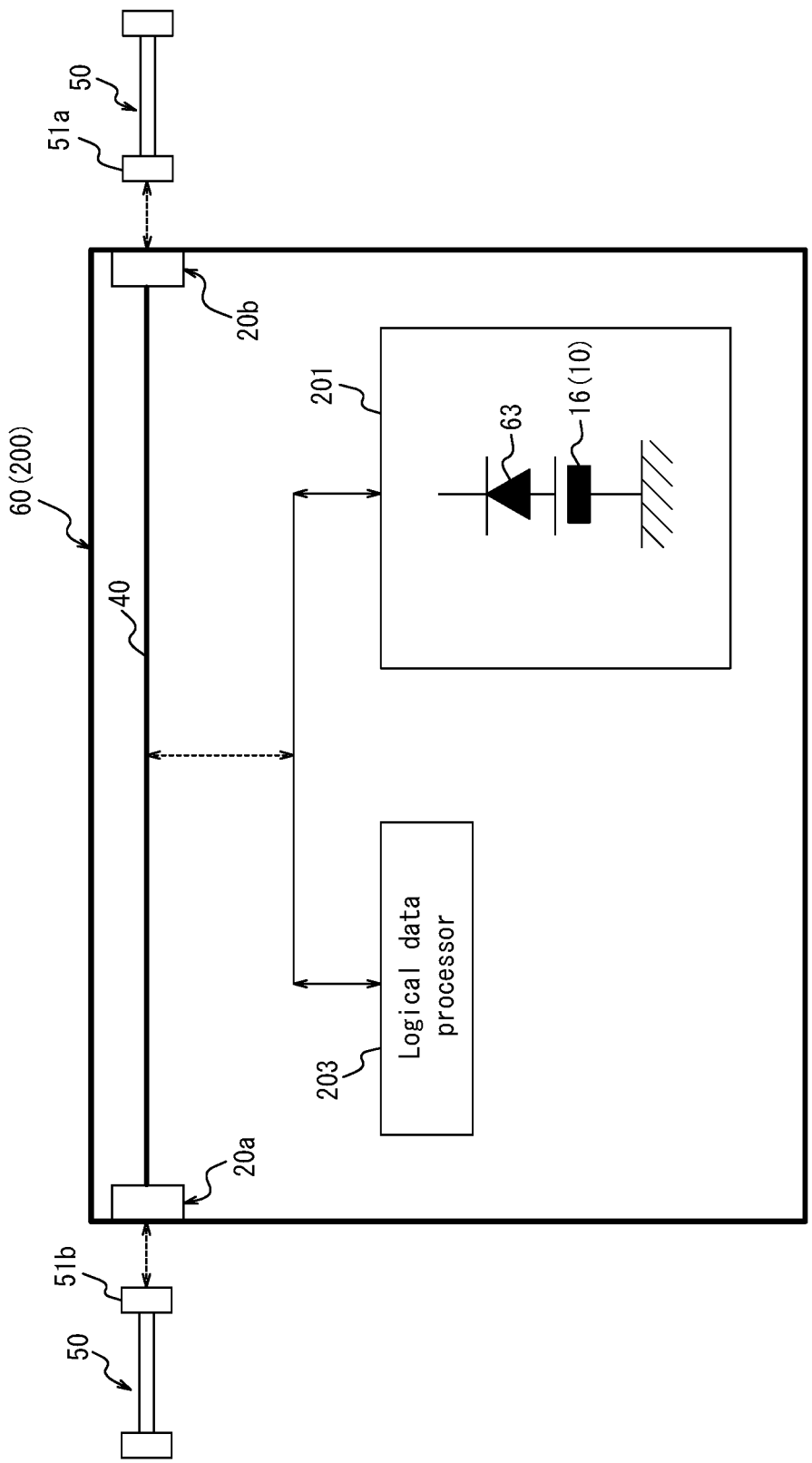
FIG. 12 is a schematic view of a configuration example of an energy harvesting device as an energy harvesting element included in the power wiring network apparatus illustrated in FIG. 5.

FIG. 12 is a block diagram illustrating the configuration of an energy harvesting device 200 as the energy harvesting element 60. The energy harvesting device 200 includes a power generator 201, which includes the energy harvesting unit 10, and a logical data processor 203 that processes data transmitted to and received from the power line.

The power generator 201 includes a solar cell panel 16 as the energy harvesting unit 10 and a reverse current prevention unit 63 that suppresses current from the first connector 20a and the second connector 20b from flowing into the energy harvesting unit 10. The reverse current prevention unit 63 in the present embodiment is configured as a diode connected so that the cathode is on the first connector 20a and the second connector 20b side.

Figure 13:
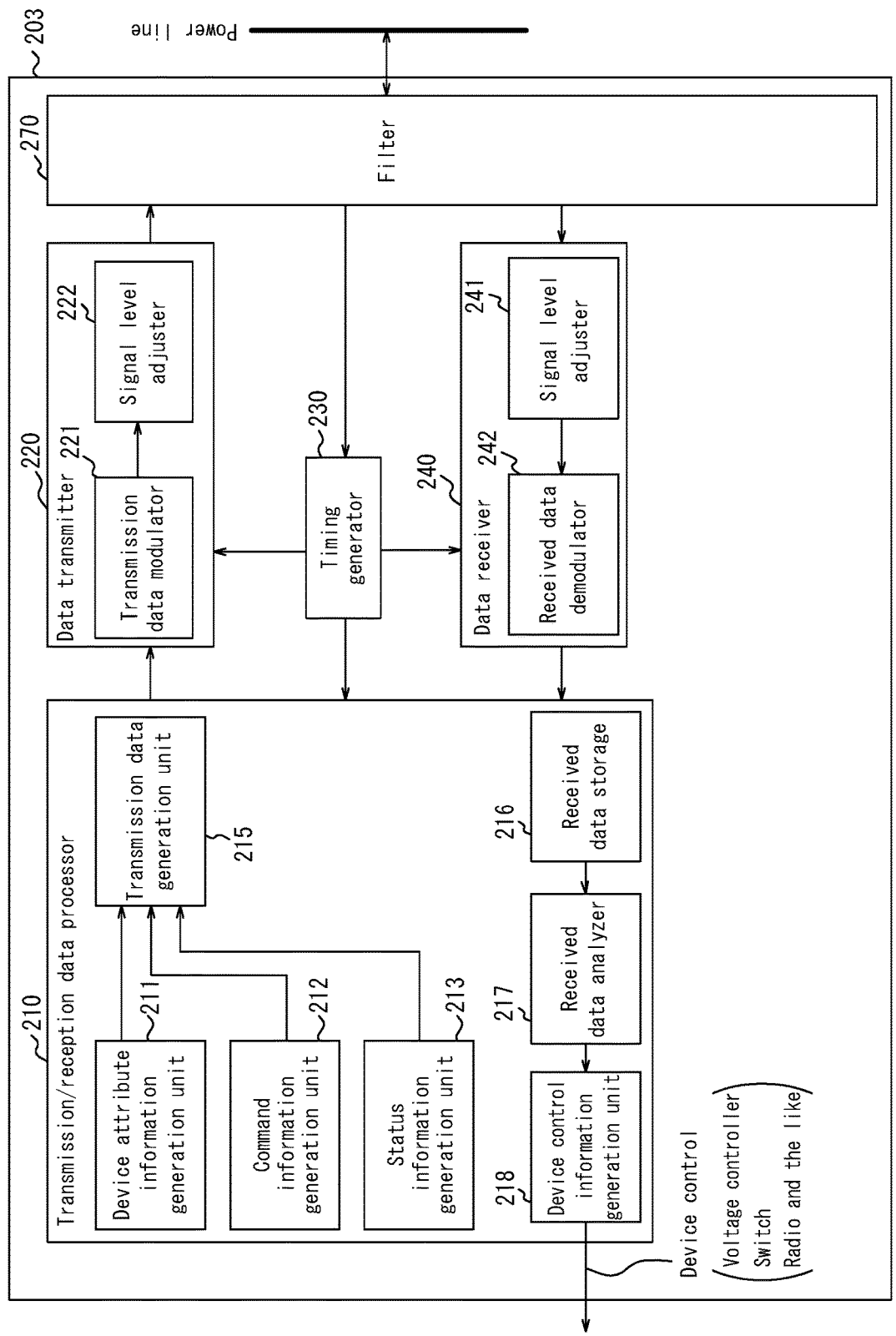
FIG. 13 is a schematic view of a configuration example of a logical data processor included in the energy harvesting device illustrated in FIG. 12.

The logical data processor 203 executes processing such as transmission and reception of data via the power line. FIG. 13 illustrates the configuration of the logical data processor 203. The logical data processor 203 has a configuration close to that of the logical data processor 103 illustrated in FIG. 10, except that the configuration of a timing generator 230 differs, and the synchronization signal generation unit 150 is omitted.

Figure 14:
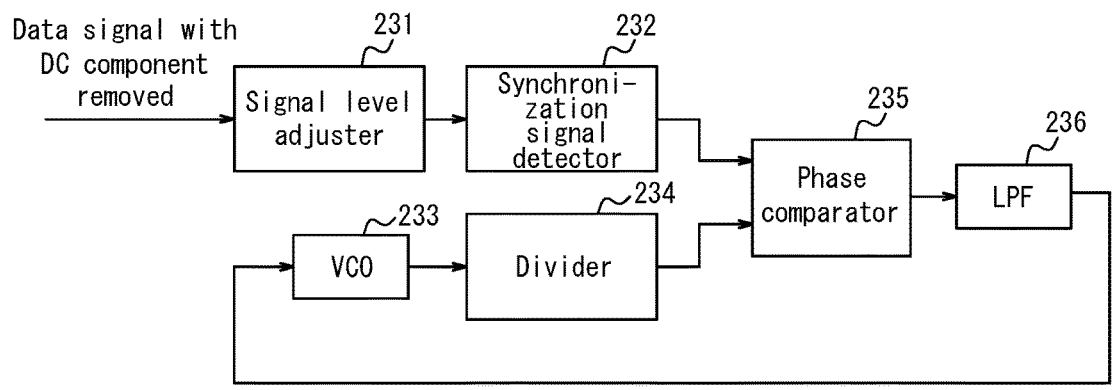
FIG. 14 is a schematic view of a configuration example of a timing generator included in the logical data processor illustrated in FIG. 13.
Figure 14:
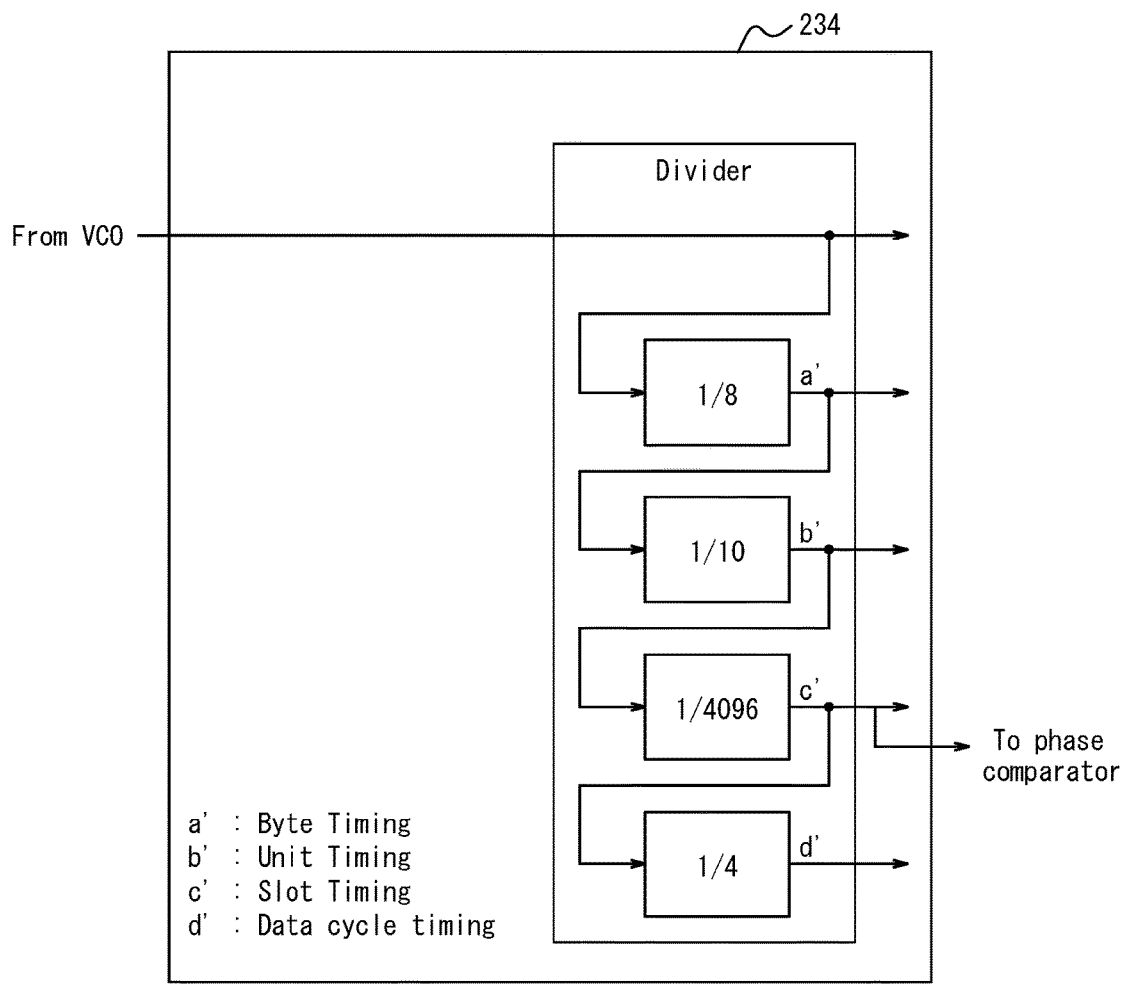

The logical data processor 203 includes the timing generator 230 that has a configuration partially differing from that of the timing generator 130 illustrated in FIG. 10. The configuration of the timing generator 230 is illustrated in FIG. 14.

The timing generator 230 includes a signal level adjuster 231 for adjusting the signal level of the data signal, received from the power line via the filter 270, from which the DC component was removed, a synchronization signal detector 232 for detecting the synchronization signals S1 to S4 from the level-adjusted data signal, a voltage-controlled oscillator (VCO) 233, a divider 234, a phase comparator 235, and a low pass filter (LPF) 236. This configuration can be used to form a phase locked loop (PLL) circuit that takes the synchronization signals S1 to S4 on the data signal as input reference signals. In other words, a phase comparison between the synchronization signals S1 to S4, on the data signal, that become input reference signals and the obtained timing signal makes it possible to obtain a timing signal synchronized with the synchronization signals S1 to S4 on the data signal and timing signals a' to d' yielded by dividing by a predetermined dividing ratio. At this time, one cycle of the timing signal a' obtained by division by eight corresponds to the period of one byte. One cycle of a timing signal b' obtained by dividing the timing signal a' by 10 corresponds to the period of one unit configured to have a length of 10 bytes, as described below. One cycle of a timing signal c' obtained by further dividing the timing signal b' by 4096 corresponds to the period of one slot configured to have a length of 4096 units, as described below. One cycle of a timing signal d' obtained by further dividing the timing signal c' by four corresponds to the period of one data cycle configured to have a length of four slots, as described below.

A transmission/reception data processor 210 inside the logical data processor 203 may, for example, be configured to generate status information, in a status information generation unit 213, consisting of the generated power in the energy harvesting unit 10 and transmit the status information as transmission data to another device. In this way, another circuit element can effectively use the generated power from the energy harvesting element 60.

In a secondary battery device 300 as the secondary battery element 80 capable of supplying power to the load element 70, the power generator 201 in FIG. 12 is replaced by a battery unit 301 that includes the reverse current prevention unit 85, the switch 83, the voltage controller 84, and the secondary battery 82. A device control information generation unit 218 of the logical data processor 203 mounted in the secondary battery device 300 controls the switch 83 to switch the secondary battery 82 between a charging state and a discharging state. The device control information generation unit 218 may perform operations such as control of the voltage controller 84. The transmission/reception data processor 210 inside the logical data processor 203 may, for example, be configured to generate status information, in the status information generation unit 213, consisting of the stored electricity in the secondary battery 82 and transmit the status information as transmission data to another device. In this way, another circuit element can effectively use the electricity stored in the secondary battery 82.

In a radio device 400 as the load element 70, the power generator 201 in FIG. 12 is replaced by a radio 401. The device control information generation unit 218 of the logical data processor 203 mounted in the radio device 400 controls the radio 401 to change stations and adjust the volume.

Figure 15:
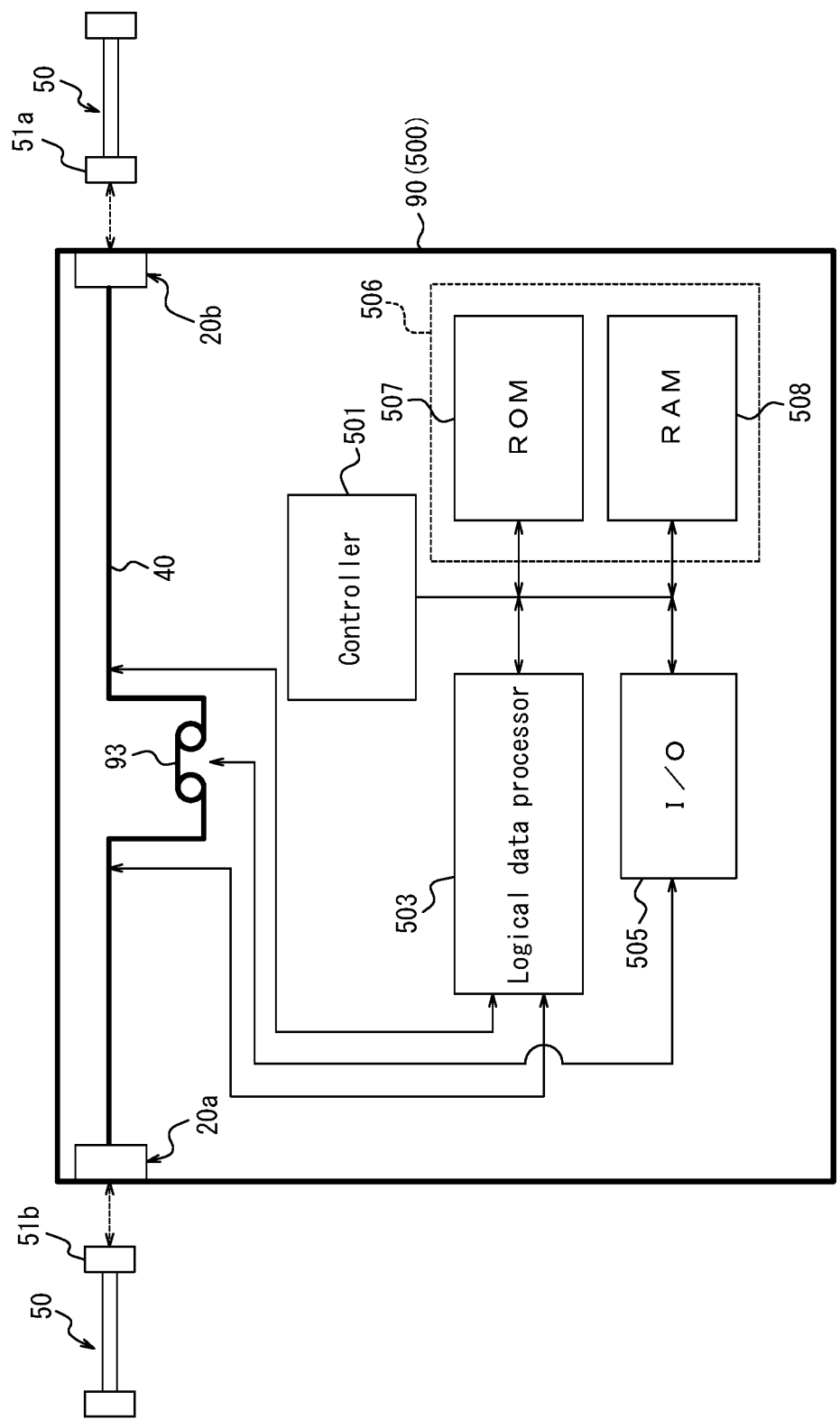
FIG. 15 is a schematic view of a configuration example of an interrupting/conducting device as a switching element included in the power wiring network apparatus illustrated in FIG. 5.

Next, the configuration of an interrupting/conducting device 500 as the switching element 90 is described. FIG. 15 is a block diagram illustrating the configuration of the interrupting/conducting device 500 as the switching element 90. The interrupting/conducting device 500 includes a controller 501 for controlling the device overall, a logical data processor 503 for processing data transmitted to and received from the power line, a storage 506 including a ROM 507, a RAM 508, and the like, a switch 93 for switching the connection of two power lines that pass through the interrupting/conducting device 500, an I/O processor 505 for supplying a switching signal to the switch 93, and the first connector 20a and second connector 20b. The first connector 20a and the second connector 20b are electrically connectable inside the switching element 90 (interrupting/conducting device 500) via the switch 93. Only one conductive portion of the two-wire conductive portion 40 connecting the first connector 20a and the second connector 20b is illustrated in FIG. 15. The controller 501, the logical data processor 503, and the storage 506 receive a supply of power from the power line to operate (the supply route from the power source is not illustrated). The interrupting/conducting device 500 may be configured to include only a portion of the storage 506 illustrated in FIG. 15 or not to include the storage 506.

The differences from the energy harvesting device 200 in the configuration of the interrupting/conducting device 500 are mainly described here.

The controller 501 controls the logical data processor 503, the storage 506, the I/O processor 505, and the like, as described below. In the example of FIG. 15, the controller 501 controls the switch 93 through control of the I/O processor 505, but the controller 501 may be configured to control the switch 93 directly. The controller 501 can be configured by one or more CPUs, application specific integrated circuits (ASICs), digital signal processors (DSPs), programmable logic devices (PLDs), field programmable gate arrays (FPGAs), microcontrollers, or the like.

Figure 16:
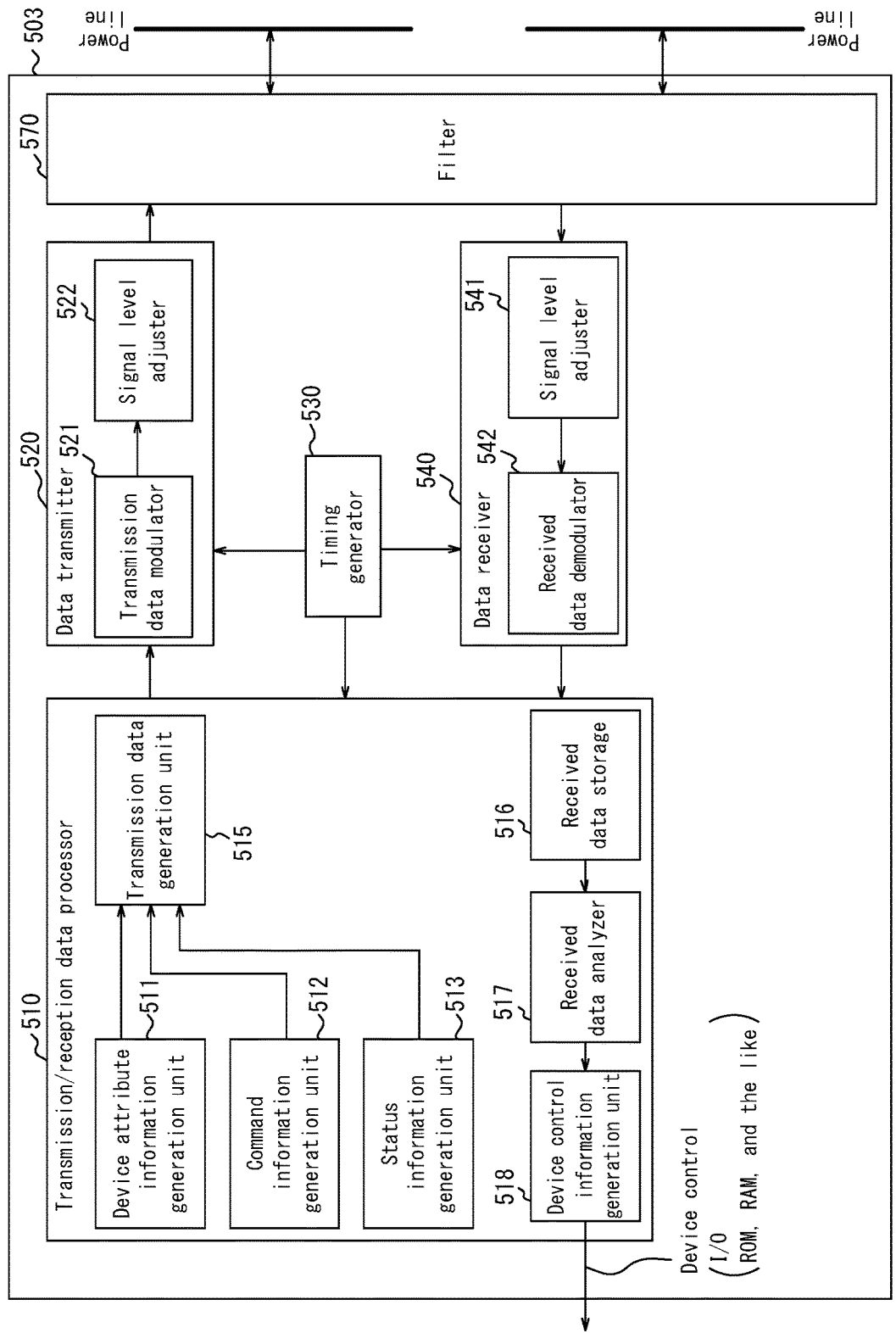
FIG. 16 is a schematic view of a configuration example of a logical data processor included in the interrupting/conducting device illustrated in FIG. 15.

The logical data processor 503 executes processing such as transmission and reception of data via the power line. As illustrated in FIG. 16, the logical data processor 503 has a configuration similar to that of the logical data processor 203 included in the energy harvesting device 200. The logical data processor 503 can exchange signal data with either or both of the circuit elements on the left side of the switching element 90 and the circuit elements on the right side of the switching element 90 in FIG. 5. In other words, when the circuit elements on the left or right of the switching element 90 are disconnected by switching of the switch 93, the logical data processor 503 exchanges signal data with either the circuit elements on the left side of the switching element 90 or the circuit elements on the right side of the switching element 90 in FIG. 5. A non-illustrated switching element controlled by the I/O processor 505, for example, can be used to switch the logical data processor 503 between exchanging signal data with the circuit elements on the left and on the right of the switching element 90. The selection of whether the logical data processor 503 exchanges signal data with the circuit elements on the left or the right of the switching element 90 may, for example, be made by the user with an application program on the external device 700, or the switching may occur at fixed intervals. When the user makes the selection on the external device 700, a command is transmitted via the network management device 100 to the interrupting/conducting device 500. On the other hand, when the circuit elements on the left and right of the switching element 90 are connected by switching of the switch 93, the same signal data is superimposed on the power lines to the left and right of the switching element 90. The logical data processor 503 therefore exchanges signal data with the circuit elements on the left and right of the switching element 90. When DC power between the circuit elements on the left and right of the switching element 90 is interrupted by switching of the switch 93, an electrical connection for signal transmission by AC power may be maintained between the circuit elements on the left and right of the switching element 90. In this case, the logical data processor 503 can exchange signal data with the circuit elements on the left and right of the switching element 90.

The same data signal is superimposed on the power lines to the left and right of the switching element 90 when the circuit elements to the left and right of the switching element 90 in FIG. 5 are connected by the switch 93, or when the circuit elements to the left and right of the switching element 90 are continually AC coupled. In this case, the network management device 100 on the left side and the network management device 100 on the right side of the switching element 90 in FIG. 5 are controlled so that only one functions as a network management device, whereas the other does not.

The logical data processor 503 analyzes the received data from a data receiver 540 using a received data analyzer 517 and generates device control information in a device control information generation unit S18. The device control information is, for example, control information of the I/O processor 505, the ROM 507, the RAM 508, and the like. The device control information may be control information of the switching element for determining whether the logical data processor 503 exchanges signal data with the circuit elements on the left or the right of the switching element 90.

The I/O processor 505 controls switching elements in the switch 93 and the like by switching an output voltage between high and low and judges the state and the like of various devices based on an input voltage. The I/O processor 505 can be configured by an input/output port of a microcomputer as the controller 501, for example, or by dedicated hardware.

Figure 17:
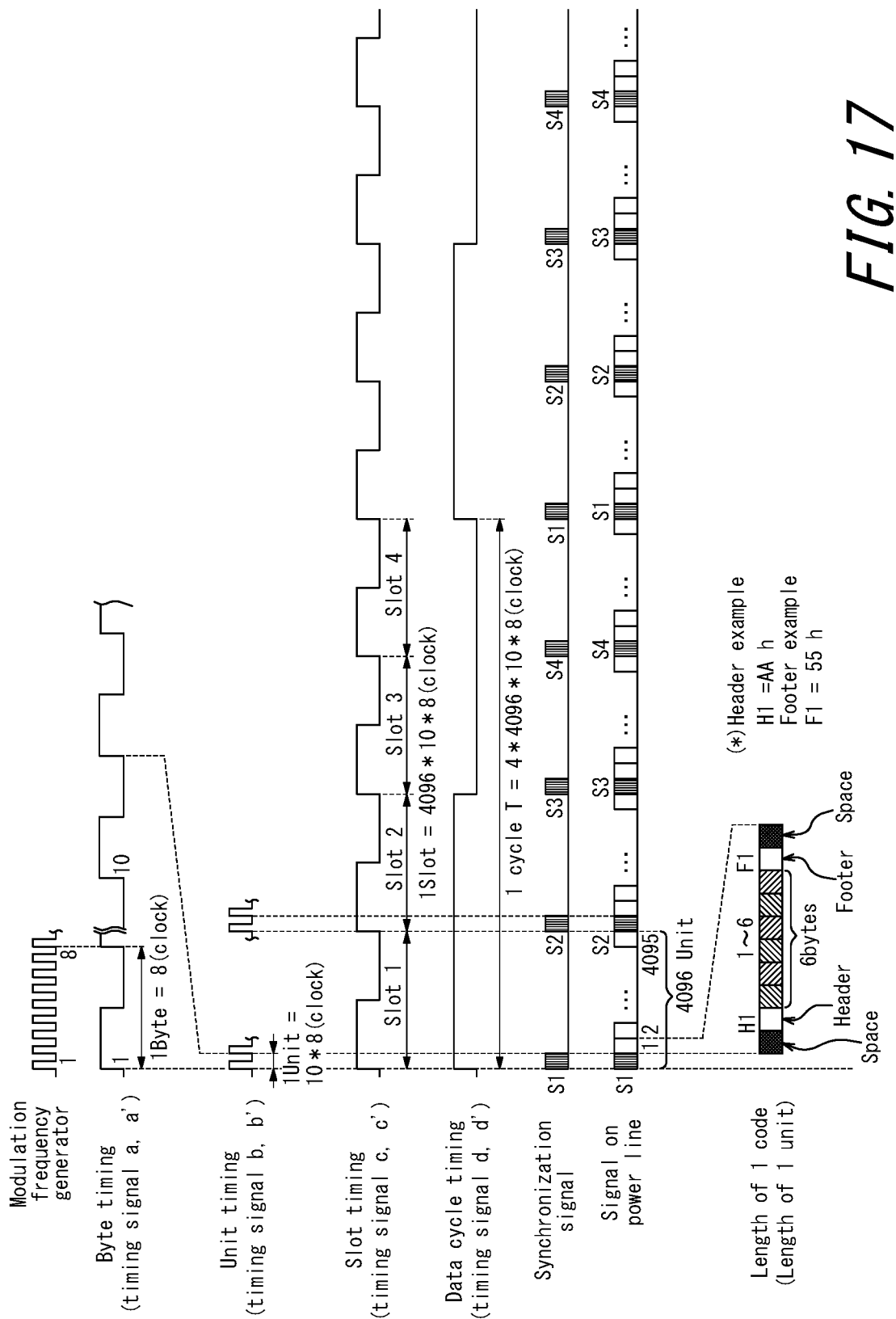
FIG. 17 is a timing chart illustrating an example of various timing signals and synchronization signals generated by a timing generator used in a power wiring network apparatus according to an embodiment of the present disclosure.

Next, the various timing signals and synchronization signals S1 to S4 generated by the timing generators 130, 230, 530 are described. FIG. 17 is a timing chart illustrating the modulated wave generated by the modulation frequency generator 132 and the various timing signals and synchronization signals S1 to S4 generated from the modulated wave.

During the power line communication implemented by the power wiring network apparatus 1 according to the present embodiment, synchronization signals S1 to S4 are generated in the network management device 100, also referred to as "device 0", and the synchronization signals S1 to S4 are superimposed on DC power on the power line. At timings based on these synchronization signals S1 to S4, each device (the network management device 100, the energy harvesting device 200, the secondary battery device 300, the radio device 400, the interruption/conduction device 500, and the like) transmits data, such as attribute data, a command code, or a status code, and receives data from other devices. Only the network management device 100 (device 0) transmits the synchronization signals S1 to S4 and the command code in the present embodiment.

The network management device 100 (device 0) generates a modulated wave using the modulation frequency generator 132 in the timing generator 130 within the logical data processor 103. The modulated wave is a pulse signal having a cycle corresponding to a one bit period of the data signal, as illustrated by the uppermost portion of FIG. 17. From this modulated wave, the timing generator 130 generates a byte timing signal corresponding to a period of one byte (timing signals a, a' in FIGS. 11 and 14), a unit timing signal corresponding to a period of one unit (timing signals b, b' in FIGS. 11 and 14), a slot timing signal corresponding to a period of one slot (timing signals c, c' in FIGS. 11 and 14), and a data cycle timing signal corresponding to a period of one data cycle (timing signals d, d' in FIGS. 11 and 14).

Figure 18:
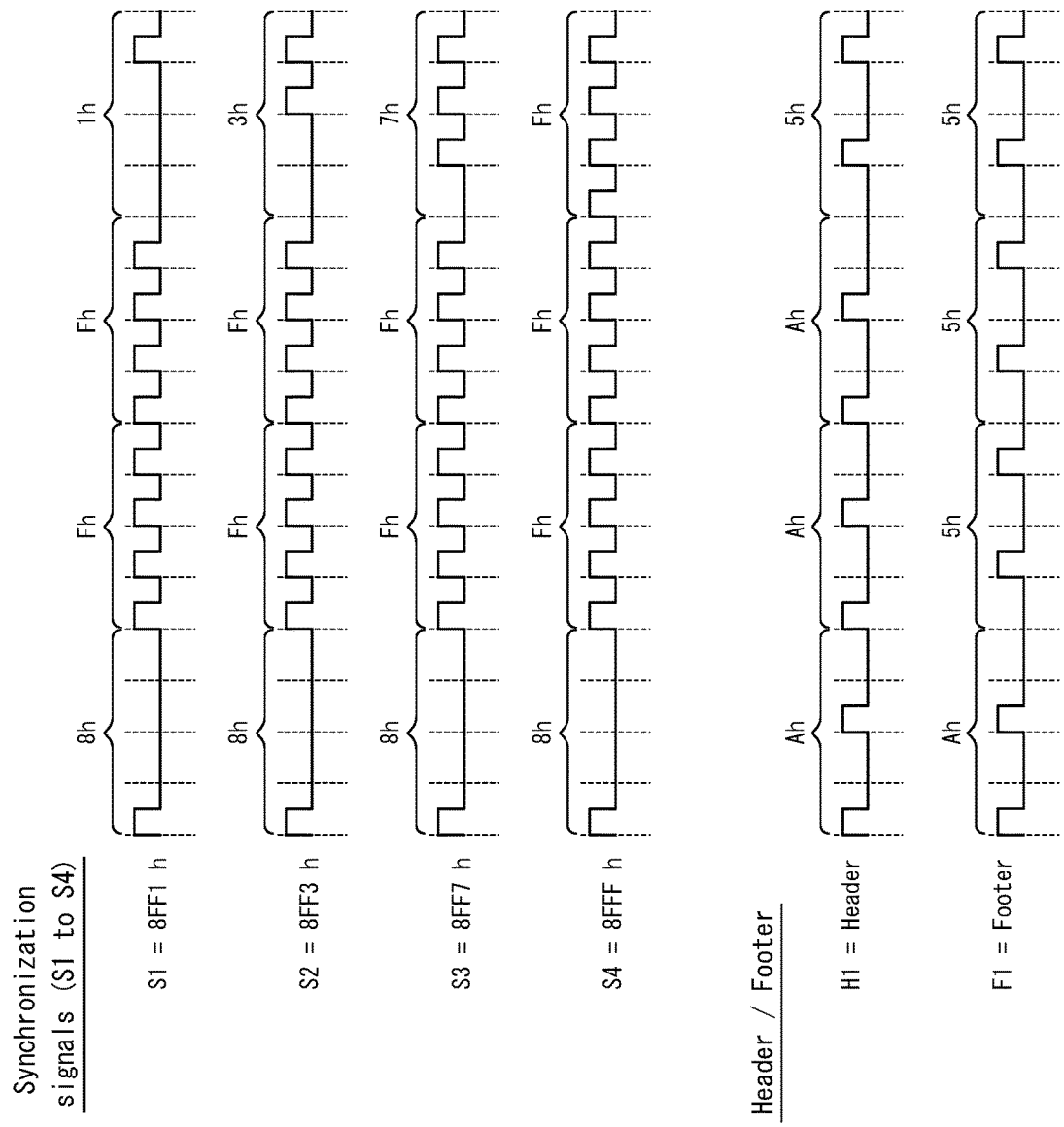
FIG. 18 is an example of synchronization signals and of a header and a footer forming one code of a data signal used in a power wiring network apparatus according to an embodiment of the present disclosure.

One unit in the timing chart of FIG. 17 corresponds to a data length of 10 bytes. As indicated in the lowermost portion of FIG. 17, data is transmitted and received in units of 10 bytes at a time during the power line communication of the present embodiment. One unit is formed by two bytes for space, two bytes for a header and a footer, and six bytes for data. FIG. 18 illustrates configuration examples of the header and the footer, but these examples are not limiting.

One slot in the timing chart of FIG. 17 corresponds to a data length of 4096 units. In the power line communication of the present embodiment, the synchronization signals S1 to S4 are transmitted in this order from the network management device 100 (device 0) every slot, i.e. every 4096 units. During one slot, each device can transmit 4095 units of a data signal after the synchronization signals S1 to S4 that have a length of one unit.

The synchronization signals S1 to S4 and the header and footer in each unit can, for example, be defined as illustrated in the example of FIG. 18. In the example of FIG. 18, codes are allocated so that the first bit and the last bit become 1 in each signal. This enables the start position and end position of the code to be easily recognized from the data signal.

In the present embodiment, the attribute data of each device is transmitted within the 4095 units following the synchronization signal S1, command data for each device is transmitted within the 4095 units following the synchronization signal S2, and status data from each device is transmitted within the 4095 units following the synchronization signal S3. Accordingly, upon detecting the synchronization signal corresponding to S1 in FIG. 18, each device can recognize that the attribute signal of each device is transmitted after S1. Similarly, upon detecting the synchronization signal corresponding to S2 in FIG. 18, each device can recognize that the command code for each device is transmitted after S2. Upon detecting the synchronization signal corresponding to S3 in FIG. 18, each device can recognize that the status code for each device is transmitted after S3.

Figure 19:
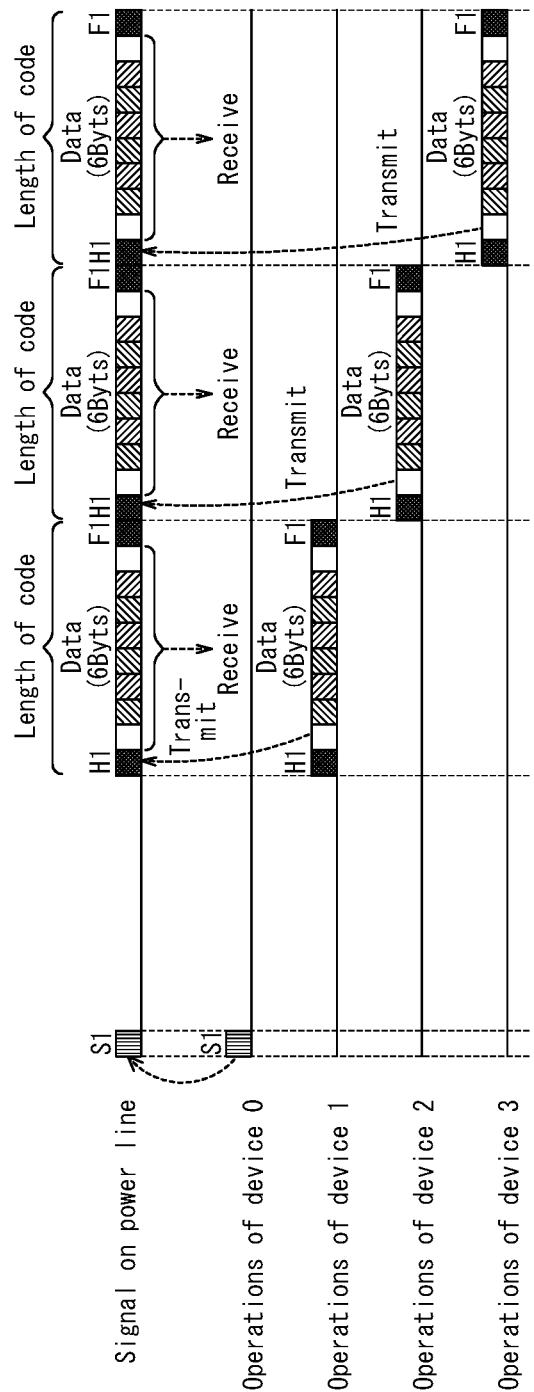
FIG. 19 illustrates transmission and reception of attribute data of each device used in a power wiring network apparatus according to an embodiment of the present disclosure.

Next, the attribute data transmitted by each device is described. FIG. 19 illustrates attribute data being transmitted and received for the case of at least three devices other than the network management device 100 (device 0) being connected to the power wiring network apparatus 1. Devices 1, 2, 3, . . . in FIG. 19 indicate the devices other than the network management device 100 (device 0).

The attribute data transmitted by each device is allocated to a domain (i.e. slot 1) with a length of 4095 units after the synchronization signal S1 is outputted. The attribute data is transmitted from each device during this time domain. In FIG. 19, a length of one unit immediately after the synchronization signal S1 occurs is allocated to the network management device 100 (device 0). Only the network management device 100 (device 0) can transmit its own attribute data during the one unit immediately after the synchronization signal S1 occurs (in FIG. 19, the network management device 100 (device 0) does not transmit its own attribute data).

A length of one unit after the elapse of the unit allocated to the network management device 100 (device 0) is allocated to device 1 in the example of FIG. 19. During this period with a length of one unit allocated to device 1, device 1 transmits its own attribute data by superimposing the attribute data on the power line as a data signal. The other devices (device 0, device 2, device 3, and the like) receive the attribute data transmitted by device 1, recognize that device 1 is allocated as the device following device 0, and recognize the attributes of device 1. Accordingly, the attribute data from device 1 fulfills the role of a notification signal providing notification to other devices that device 1 is present. In particular, the network management device 100 (device 0) always receives the data signal during the 4095 units after the synchronization signal S1 and monitors all of the devices present within the network. The network management device 100 (device 0) detects whether each device is present and detects the attribute data. Accordingly, the network management device 100 (device 0) can rapidly detect when a device is inserted or removed. Table 1 illustrates an example of attribute data of a device.

TABLE 1

| Unit position | Byte position | Item | Code | Number of bytes |
|---|---|---|---|---|
| 1 | 1 | device manufacturer | 10h | 1 |
| 1 | 2 | device type | 40h | 1 |
| 1 | 3 | device identifier | 11h | 1 |
| 1 | 4-6 | device characteristics | 00 00 00h | 3 |

The item "device manufacturer" includes a code corresponding to the manufacturer of each device as the attribute data. The "device type" includes a code corresponding to the device type (for example, solar cell, secondary battery, passive load, active load, or the like) as attribute data. The "device identifier" includes a code corresponding to the device identifier (for example, speaker, radio, or the like) as attribute data. The item "device characteristics" includes a code corresponding to other characteristics of the device as the attribute data.

The network management device 100 (device 0) is always used when the power wiring network apparatus 1 is used as a network system. When only the physical layer is used, however, the network management device 100 (device 0) need not be present. The network management device 100 is always allocated to device 0 (device number: 0) in the present embodiment.

A length of one unit after the elapse of the unit for attribute data transmission allocated to device 1 is allocated to device 2 in the example of FIG. 19. During the period with a length of one unit allocated to device 2, device 2 transmits its own attribute data by superimposing the attribute data on the power line as a data signal. The other devices (device 0, device 1, device 3, and the like) can receive this attribute data transmitted from device 2. In particular, the network management device 100 (device 0) recognizes that device 2 is allocated as the device following device 1 and recognizes the attributes of device 2. Accordingly, the attribute data from device 2 fulfills the role of a notification signal providing notification to other devices that device 2 is present. The same holds for device 3.

Each device continues to output attribute data at the timing allocated to the device until being disconnected from the power wiring network apparatus 1.

When the domain allocated for attribute data in slot 1 is insufficient, the domain may be expanded to other slots.

Figure 20:
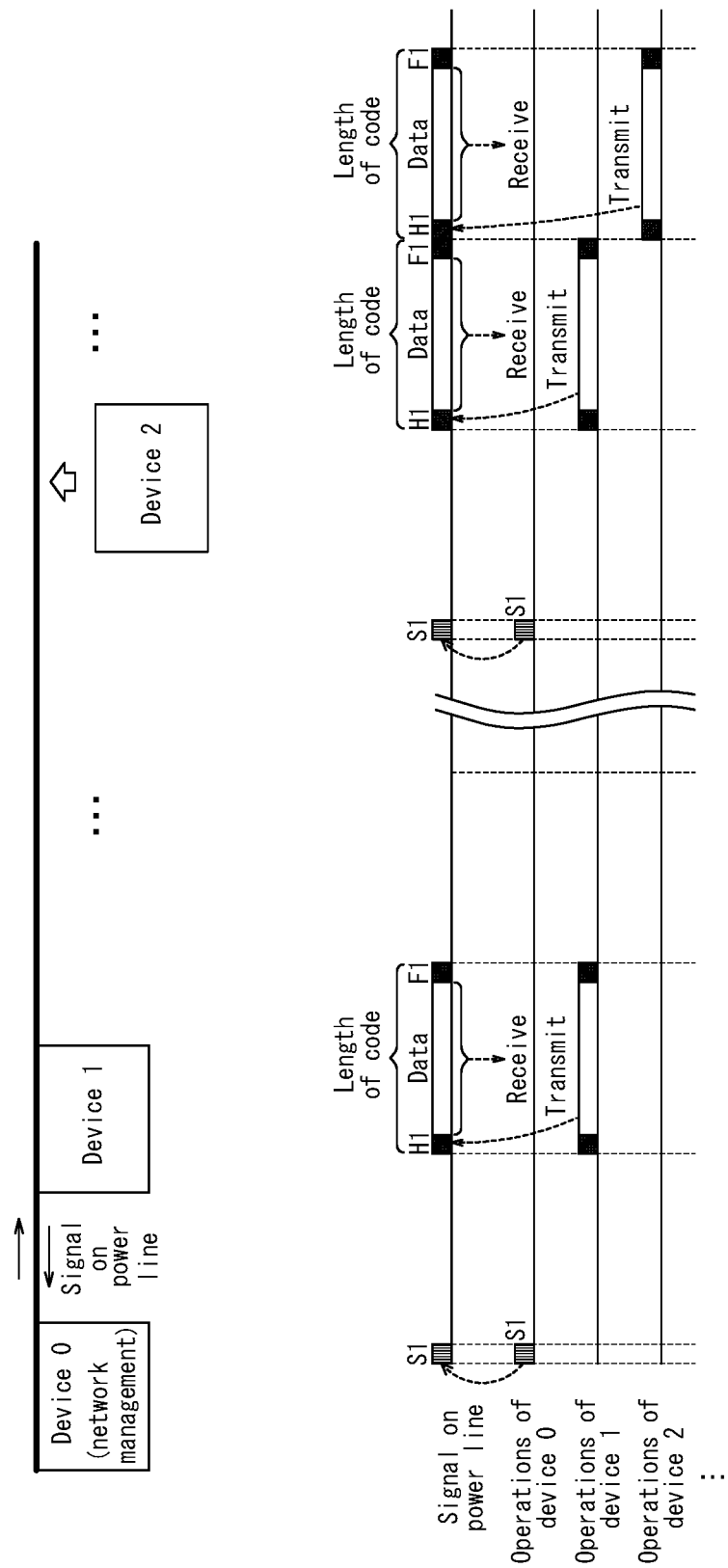
FIG. 20 illustrates transmission and reception of attribute data when a device is newly connected to the network in a power wiring network apparatus according to an embodiment of the present disclosure.

Next, with reference to FIG. 20, the allocation of the timing for each device to transmit the attribute data is described next. FIG. 20 illustrates operations when device 2 is newly connected during a state in which only the network management device 100 (device 0) and device 1 are connected on the power line, as illustrated at the upper portion of FIG. 20. Only the attribute data of device 1 is transmitted on the power line after output of the first synchronization signal S1 after device 2 is connected, as illustrated in FIG. 20. The network management device 100 (device 0) only detects the attribute data of device 1 after output of the synchronization signal S1 and therefore recognizes that only device 1 is connected to the network. After the newly connected device 2 receives the first synchronization signal S1 after being connected, device 2 receives only the attribute data of device 1 and detects that the next unit after the attribute data of device 1 is a no-signal period. Device 2 receives the second synchronization signal S1, and during the no-signal period that is the next unit after receiving the attribute data of device 1, device 2 transmits its own attribute data. The network management device 100 (device 0) receives the attribute data of device 2 during the unit following the attribute data of device 1 and recognizes that device 2 is connected to the network in addition to device 1.

In this way, the device newly connected to the network (device 2 in the above example) detects the no-signal period closest to the synchronization signal S1 after receiving S1 (excluding the period of one unit, immediately after the synchronization signal S1, allocated to the network management device 100 (device 0)) and occupies the no-signal period as its own attribute data transmission period. The network management device 100 (device 0) recognizes the newly connected device (device 2 in the above example) by newly receiving the attribute data from newly connected device.

When a device from device 1 onward is disconnected during operation of the network management device 100 (device 0), the attribute data transmission period of the disconnected device becomes a no-signal period. A subsequently connected device detects this no-signal period and newly occupies the no-signal period as its own attribute data transmission period.

As illustrated in the upper portion of FIG. 20, the connector position where a device is inserted and the device number do not correspond. When each device detects a no-signal period within slot 1, the device occupies the no-signal period closest to S1 as its own attribute data transmission period and acquires a device number corresponding to the time position of the no-signal period within slot 1. However, device 0 is always allocated to the network management device 100.

In the present embodiment, the attribute data of each device is configured as fixed-length modulation data. This configuration as fixed-length modulation data enables each device to occupy a no-signal period of a fixed length, detected after receipt of the synchronization signal S1, as the device's own fixed-length attribute data transmission period. Since the attribute data is fixed length, the network management device 100 (device 0) can identify the device number of each set of attribute data from only the elapsed time after receipt of the synchronization signal S1.

Figure 21:
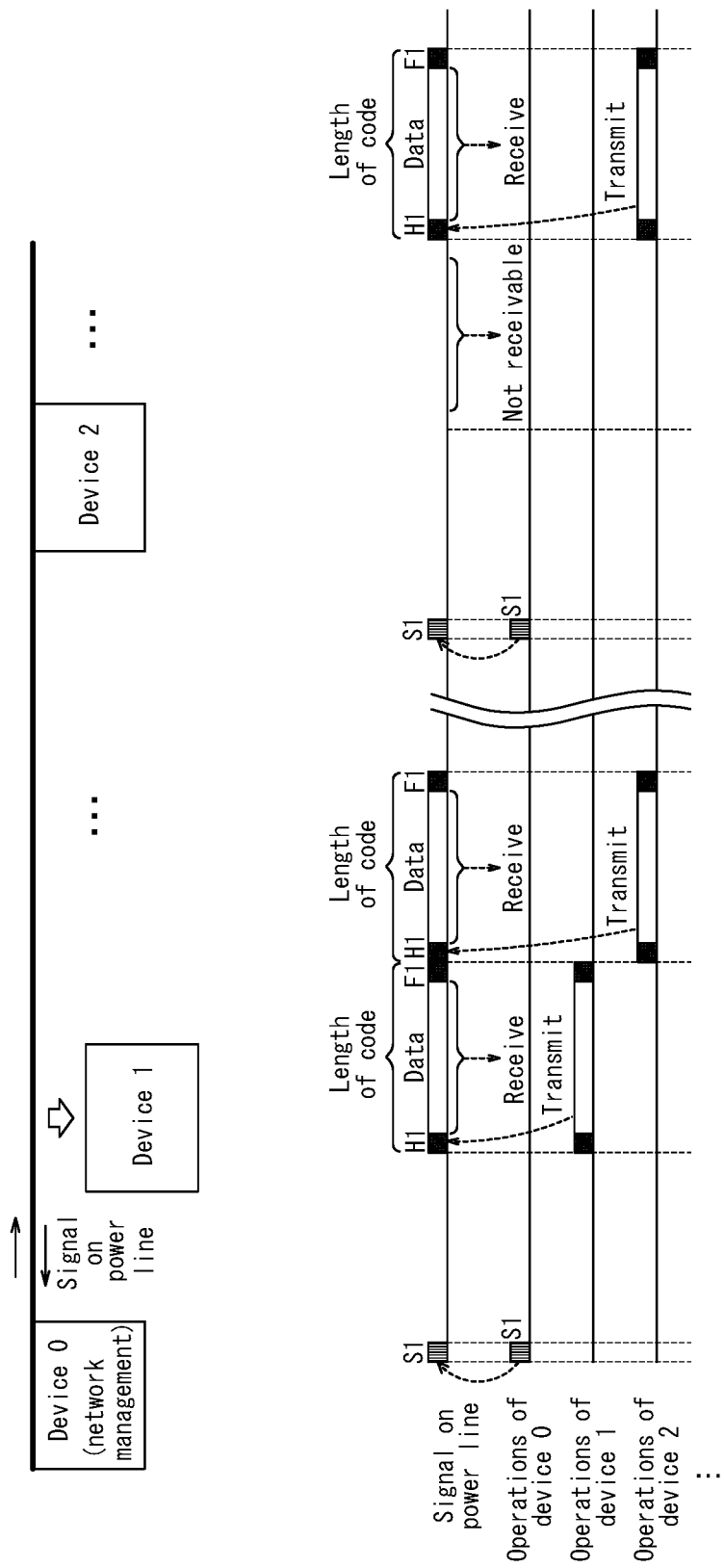
FIG. 21 illustrates transmission and reception of attribute data when a device is disconnected from the network in a power wiring network apparatus according to an embodiment of the present disclosure.

FIG. 21 illustrates the state in which only device 1 is disconnected from the state illustrated in FIG. 20. In the timing chart illustrated in FIG. 21, the network management device 100 (device 0) receives both the attribute data of device 1 and the attribute data of device 2 after transmitting the first synchronization signal S1 and recognizes that device 1 and device 2 are present on the network. After transmitting the second synchronization signal S1 in FIG. 21, however, the network management device 100 (device 0) can only receive attribute data of device 2 and therefore recognizes that device 1 is not present on the network. The network management device 100 (device 0) recognizes that device 2 is present on the network and continues to exchange data with device 2.

Figure 22:
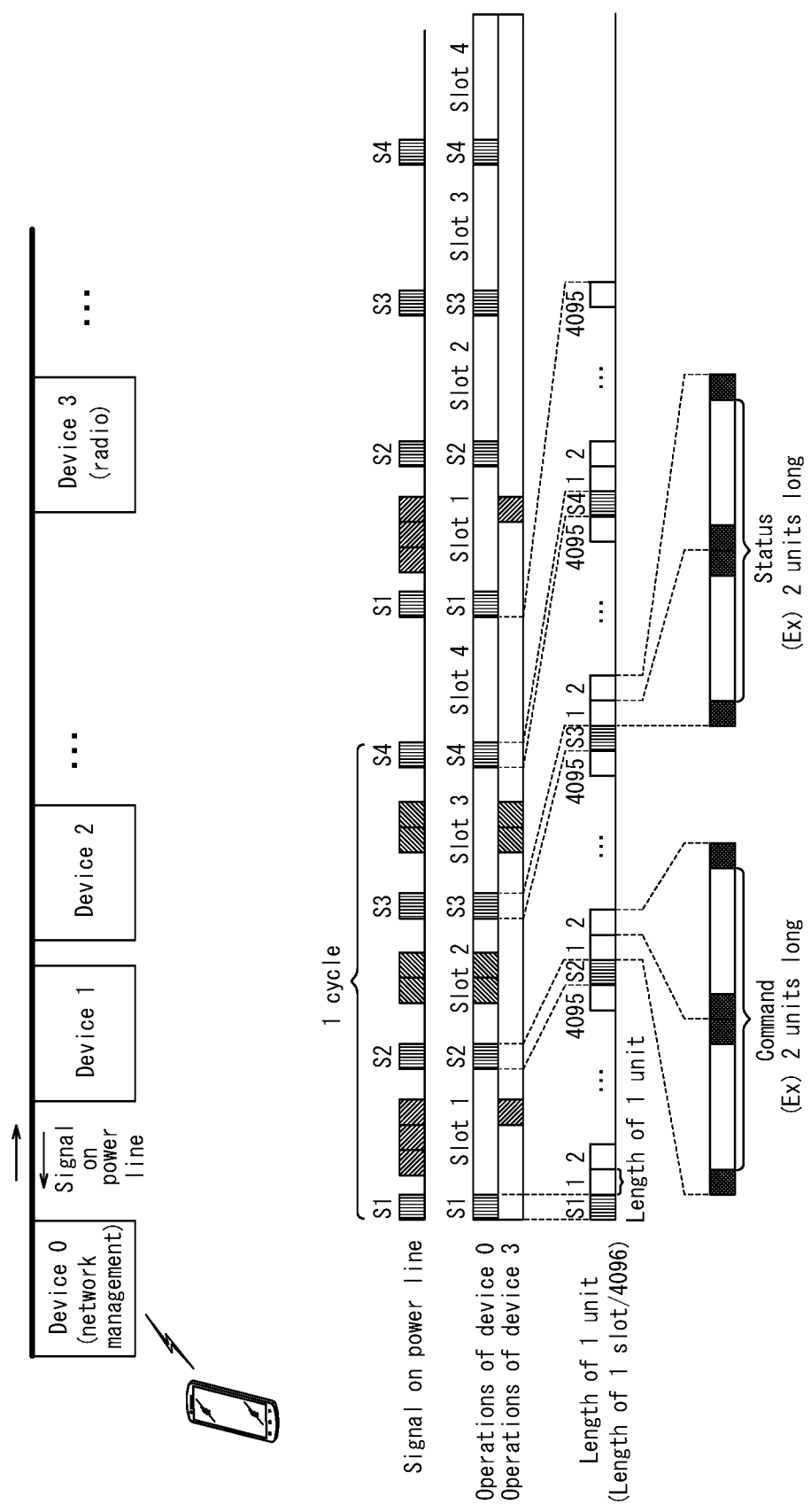
FIG. 22 illustrates transmission and reception of attribute data, commands, and status in a power wiring network apparatus according to an embodiment of the present disclosure.

The upper portion of FIG. 22 illustrates a state in which the network management device 100 (device 0) and devices 1 to 3 are connected on the power line. FIG. 22 illustrates how, in this state, a command code is transmitted and received after receipt of the synchronization signal S2, and a status code is transmitted and received after receipt of the synchronization signal S3. Devices 1 to 3 are devices other than the network management device 100. Device 3 is assumed to be the radio device 400 as a load element 70. The timing chart of devices 1, 2 in FIG. 22 is omitted.

The network management device 100 (device 0) and devices 1 to 3 are connected to the network illustrated in the upper portion of FIG. 22. Therefore, attribute data from devices 1 to 3 is superimposed on the power line after transmission of the synchronization signal S1 (slot 1). When a length of 4095 units elapses after the synchronization signal S1 is transmitted, the synchronization signal S2 from the network management device 100 (device 0) is transmitted and superimposed on the power line.

The command code transmitted by each device (transmitted by the network management device 100 (device 0) in the present embodiment) is allocated to a domain (i.e. slot 2) with a length of 4095 units after the synchronization signal S2 is outputted. The command code is transmitted from the network management device 100 (device 0) during this time domain. In the example of FIG. 22, a command with a length of two units is transmitted from the network management device 100 (device 0) at the time position of the third unit after the synchronization signal S2 is transmitted. Table 2 illustrates an example of command information.

TABLE 2

| Unit position | Byte position | Item | Code | Number of bytes |
|---|---|---|---|---|
| 1 | 1-2 | command recipient | 0003h | 2 |
| 1 | 3-4 | command allocation unit number | 0003h | 2 |
| 1 | 5-6 | command length | 0002h | 2 |
| 2 | 1-2 | command code | 0800h | 2 |
| 2 | 3-6 | command parameter | 0h-FFFFFFFFh | 4 |

The item "command recipient" designates the recipient of the command by device number. The item "command allocation unit number" designates the unit in slot 2 in which the command is to be transmitted. The "command length" designates the length of the command as a number of units. The "command code" is a code corresponding to an instruction (control information) for each device and is variable length data. The "command parameter" is a parameter appended to the command and is transmitted simultaneously with the command. In the example in Table 2, the command is transmitted to device 3, the command is transmitted in the third unit of slot 2, the command length is two units, and the command code is "0800h".

In the present embodiment, the commands transmittable to the radio device 400 include "power on", "power off", "change AM station", "change FM station", and "adjust volume", for example. When "change AM station" or "change FM station" is transmitted as the command, the station frequency can be increased or decreased by a command parameter being transmitted together with the command. When "adjust volume" is transmitted as the command, the volume can be raised or lowered by a command parameter being transmitted together with the command.

As described above, the command length can be changed in the present embodiment. In other words, a command code containing control information of a device can be transmitted as variable length data. This enables flexible support for devices in accordance with the type of command (control information) or the like and also enables a plurality of circuit elements to share a power line communication environment efficiently.

When a length of 4095 units elapses after the synchronization signal S2 is transmitted, the synchronization signal S3 from the network management device 100 (device 0) is transmitted and superimposed on the power line.

The status code transmitted by each device is allocated to a domain (i.e. slot 3) with a length of 4095 units after the synchronization signal S3 is outputted. The status code is transmitted from each device (device 0 to device 3 in the example of FIG. 22) during this time domain. In the example of FIG. 22, a status code with a length of two units is transmitted from device 3 at the time position of the third unit after the synchronization signal S3 is transmitted. Table 3 illustrates an example of status information.

TABLE 3

| Unit position | Byte position | Item | Code | Number of bytes |
|---|---|---|---|---|
| 1 | 1-2 | status sender | 0003h | 2 |
| 1 | 3-4 | status allocation | 0003h | 2 |

TABLE 3-continued

| Unit position | Byte position | Item | Code | Number of bytes |
|---|---|---|---|---|
| | | unit number | | |
| 1 | 5-6 | status length | 0002h | 2 |
| 2 | 1-2 | status code | 0800h | 2 |
| 2 | 3-6 | status parameter | 0h-FFFFFFFFh | 4 |

The item "status sender" designates the sender of the status information by device number. The item "status allocation unit number" designates the unit in slot 3 in which the status information is to be transmitted. The "status length" designates the length of the status as a number of units. The "status code" is a code corresponding to the status information from each device and is variable length data. The "status parameter" is a parameter appended to the status and is transmitted simultaneously with the status. In the example of Table 3, the status is transmitted from device 3, the status is transmitted in the third unit of slot 3, the status length is two units, and the status code is "0800h".

In the present embodiment, the status transmittable from each device is "normal execution" or "execution error", for example. When the status is "execution error", an error code may be transmitted as a status parameter simultaneously with the status code.

As described above, the status length can be changed in the present embodiment. In other words, a status code containing status information of a device can be transmitted as variable length data. This enables flexible support for devices in accordance with the type of status or the like and also enables a plurality of circuit elements to share a power line communication environment efficiently.

Figure 23A:
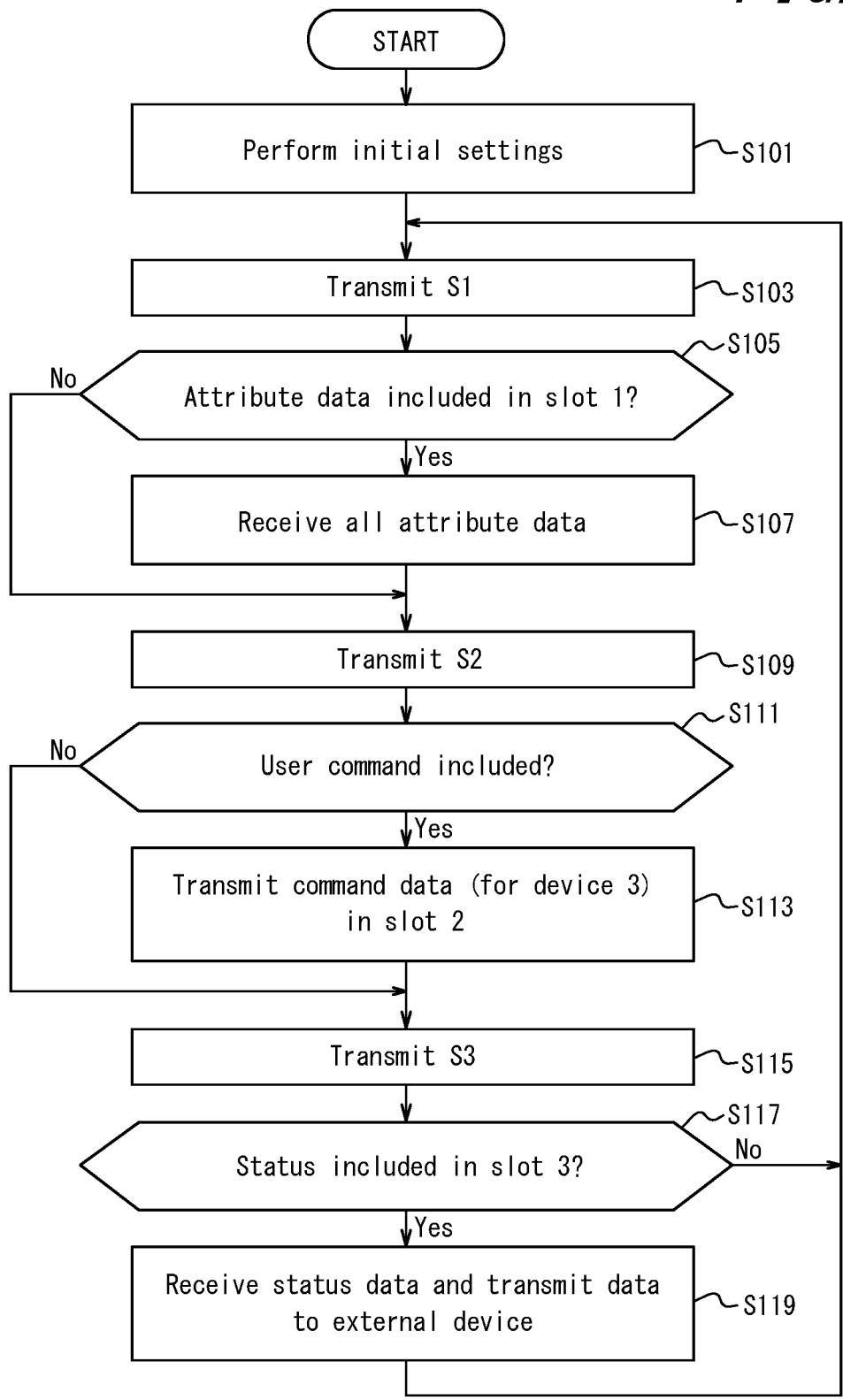
FIG. 23A is a flowchart illustrating transmission and reception of data in a network management device (device 0) in a power wiring network apparatus according to an embodiment of the present disclosure.

FIGS. 23A and 23B are flowcharts illustrating the flow of transmission and reception of commands and status between the network management device 100 (device 0) and the radio device 400 (device 3).

The network management device 100 (device 0) performs initial settings such as initialization of the controller 101 (step S101) and then transmits the synchronization signal S1 (step S103). After transmitting the synchronization signal S1, the network management device 100 (device 0) judges whether attribute data of another device is present in slot 1 (step S105) and receives all of the attribute data in slot 1 (step S107) when judging that attribute data is present (step S107). Attribute data is not received when it is judged that attribute data is not present in step S105.

The network management device 100 (device 0) transmits the synchronization signal S2 after a length of 4095 units elapses after transmission of the synchronization signal S1 (step S109). Transmission of the synchronization signal S2 marks the transition from slot 1 to slot 2, and commands can be transmitted and received. The network management device 100 (device 0) confirms whether a user command from the external device 700 is present via the wireless communication interface 105 (step S111) and transmits a power line communication command, corresponding to the user command, for device 3 in slot 2 when the user command is confirmed as being present (step S113).

The network management device 100 (device 0) transmits the synchronization signal S3 after a length of 4095 units elapses after transmission of the synchronization signal S2 (step S115). Transmission of the synchronization signal S3 marks the transition from slot 2 to slot 3, and the status can be transmitted and received. The network management device 100 (device 0) monitors the status during slot 3, i.e. until a length of 4095 units elapses after transmission of the synchronization signal S3. Upon detecting the status (step S117), the network management device 100 (device 0) receives the status and transmits the status information via the wireless communication interface 105 to the external device 700 (step S119).

When the radio device 400 (device 3) is connected to the power line by the first connector 20a and/or the second connector 20b being connected to another circuit element (step S201), the radio device 400 (device 3) searches for a no-signal period in slot 1 (step S203). Upon detecting a no-signal period, the radio device 400 (device 3) occupies the no-signal period closest to the synchronization signal S1 after reception of S1 as its own attribute data transmission period and acquires a device number, corresponding to the time position of the no-signal period, as the device number of the radio device 400 (device 3) (step S205).

When the radio device 400 (device 3) receives the synchronization signal S1 the next time, the radio device 400 (device 3) transmits its own attribute data at the time position it occupies as its own attribute data transmission period after the synchronization signal S1 (step S207). Subsequently as well, the radio device 400 (device 3) searches for the third unit position that it occupies as its own attribute data transmission period in slot 1 (step S209) and transmits its own attribute data (step S211).

The radio device 400 (device 3) monitors for a command for itself in slot 2 after transmitting its own attribute data (step S213). The radio device 400 (device 3) confirms whether a command is for the radio device 400 (device 3) by whether its own device number is designated in the item "command recipient" of Table 2. Upon detecting a command for itself, the radio device 400 (device 3) receives the command and transmits a command execution result as a status in slot 3 (step S215).

In this way, the present embodiment includes a plurality of circuit elements each comprising the first connector 20a, the second connector 20b, and the conductive portion 40 electrically connecting the first connector 20a and the second connector 20b in a manner capable of supplying power. The plurality of circuit elements includes the energy harvesting element 60 as a circuit element capable of outputting, from the first connector 20a and/or the second connector 20b, power generated by energy harvesting, and the load element 70 as a circuit element capable of consuming power inputted from the first connector 20a and/or the second connector 20b. The plurality of circuit elements are mechanically and electrically attachable and detachable via the first connector 20a and the second connector 20b. At least some of the energy harvesting elements 60 and the load elements 70 are capable of power line data communication via a power line including the first connector 20a, the second connector 20b, and the conductive portion 40. This configuration enables the construction of a power wiring network with excellent portability, without the need to maintain infrastructure.

In the present embodiment, the energy harvesting element 60 (energy harvesting device 200) includes a data transmitter 220 configured to transmit data via the first connector 20a and/or the second connector 20b. This configuration enables another circuit element to be notified, via the data transmitter 220, that the energy harvesting element 60 is connected to the network. Furthermore, the state of the energy harvesting element 60 can be transmitted to another circuit element, enabling efficient use of the power generated by the energy harvesting element 60.

In the present embodiment, at least one load element 70 (network management device 100) includes the data transmitter 120 configured to transmit data via the first connector 20a and/or the second connector 20b and includes the data receiver 140 configured to receive data. This configuration enables another circuit element to be notified, via the data transmitter 120, that the load element 70 is connected to the network. Furthermore, the load element 70 can receive a command via the data receiver 140, enabling the user to operate the load element 70 by power line communication.

In the present embodiment, the data transmitters 120, 220 are capable of transmitting a signal yielded by digital modulation of transmission data to another circuit element by superimposing the signal on the power line via the first connector 20a and/or the second connector 20b. This configuration enables high-speed communication using a power wiring network.

In the present embodiment, the data receiver 140 is configured to receive, via the first connector 20a and/or the second connector 20b, a signal yielded by digital modulation and superimposed on the power line and is configured to demodulate the signal and generate received data. This configuration enables high-speed communication using a power wiring network.

In the present embodiment, at least one load element 70 (network management device 100) is capable of generating the synchronization signal S1 and of transmitting the synchronization signal S1 to another circuit element, the synchronization signal S1 being for determining the timing of generation of a notification signal for the energy harvesting element 60 or the load element 70 to notify another circuit element that the energy harvesting element 60 or the load element 70 is present. This configuration enables the network management device 100 to easily detect a circuit element in the network.

In the present embodiment, the energy harvesting element 60 or the load element 70 is configured to receive the synchronization signal S1 and to transmit the notification signal of the energy harvesting element 60 or the load element 70 to another circuit element during a predetermined period based on the synchronization signal when the energy harvesting element 60 or the load element 70 detects no signal during the predetermined period. This configuration enables stable communication in accordance with current conditions when a circuit element is added during operation of the network. Furthermore, when a circuit element is removed during operation of the network, the network management device 100 can easily detect the removal of the circuit element.

In the present embodiment, the notification signal includes attribute data of the energy harvesting element 60 or the load element 70, and the attribute data is fixed length modulation data. This configuration enables each circuit element to occupy a no-signal period of a fixed length, detected after receipt of the synchronization signal S1, as the circuit element's own fixed-length attribute data transmission period.

In the present embodiment, at least one load element 70 (network management device 100) is configured to transmit variable length data including control information of the energy harvesting element 60 or the load element 70. This configuration enables efficient sharing of the power line communication environment among a plurality of circuit elements.

In the present embodiment, at least one energy harvesting element 60 or load element 70 is configured to transmit variable length data including status information of the at least one energy harvesting element 60 or load element 70. This configuration enables efficient sharing of the power line communication environment among a plurality of circuit elements.

In the present embodiment, the circuit elements include the switching element 90 capable of switching between electrical connection to and disconnection from another plurality of circuit elements. This configuration enables power lines to be separated into a plurality of local networks or integrated into one network. Accordingly, an entire local network can be added to another network. Furthermore, a plurality of local networks can be continually AC coupled, thereby enabling DC power to be cut off between the local networks by the switching element 90 while network communication is enabled between the local networks.

In the present embodiment, the switching element 90 includes the data transmitter 520 configured to transmit data and the data receiver 540 configured to receive data. This configuration enables another circuit element to be notified, via the data transmitter 520, that the switching element 90 is connected to the network. Furthermore, the switching element 90 can receive a command via the data receiver 540, enabling the user to operate the switching element 90 by power line communication.

In the present embodiment, the load element 70 capable of generating the synchronization signal S1 (network management device 100) is further capable of wireless communication by Bluetooth. This configuration enables a user to use circuit elements, which are connected to the power wiring network, by communicating wirelessly with the network management device 100 from the external device 700 such as a smartphone.

While the disclosed apparatus has been described by way of the drawings and embodiments, various changes or modifications may be made by those of ordinary skill in the art based on the present disclosure. Such changes or modifications are therefore included in the scope of the present disclosure. For example, the functions and the like included in the components may be rearranged in any logically consistent way, a plurality of components may be combined into one, and a single component may be divided into a plurality of components. These configurations are also included in the scope of the present disclosure.

For example, the connector 20 in the energy harvesting element 60 has been described as including the first connector 20a and the second connector 20b, but three or more connectors may be included in the connector 20.

The first connector 20a and the second connector 20b are, for example, male connectors. When the first connector 20a and the second connector 20b are male connectors, the first external connector 51a and the second external connector 51b of the connection cable 50 are female connectors. This configuration is not limiting, however, and the first connector 20a and second connector 20b may be female connectors. When the first connector 20a and the second connector 20b are female connectors, the first external connector 51a and the second external connector 51b of the connection cable 50 are male connectors. When circuit elements are directly connected to each other, one of the first connector 20a and the second connector 20b may be a male connector and the other a female connector.

The energy harvesting element 60 need not include the reverse current prevention unit 63. The energy harvesting element 60 preferably includes the reverse current prevention unit 63, however, to help prevent current from circuit elements such as other energy harvesting elements 60 from flowing into the energy harvesting unit 10 or into an external energy harvesting unit 65. The energy harvesting element 60 may include a voltage controller to control the output voltage to be constant.

The load element 70 need not include the voltage controller 73. The load element 70 preferably includes the voltage controller 73, however, to help prevent power from circuit elements such as the energy harvesting element 60 from being inputted to the load 72 or the external load 75 at higher than rated voltage, for example.

The secondary battery element 80 need not include the voltage controller 84. The secondary battery element 80 preferably includes the voltage controller 84, however, so as to control the voltage of power inputted to and outputted from the secondary battery 82.

The secondary battery element 80 need not include the reverse current prevention unit 85. The secondary battery element 80 preferably includes the reverse current prevention unit 85, however, to help prevent current from circuit elements such as other energy harvesting elements 60 from flowing into the secondary battery 82 when the switch 83 is in the power supply state.

The load element 70, the energy harvesting element 60, the secondary battery element 80, and the switching element 90 can be freely combined. For example, the load element 70 (network management device 100) and the energy harvesting element 60 (energy harvesting device 200) may be configured physically as one device.

In the example in FIG. 9, the load element 70 (network management device 100) is configured so that the controller 101, the logical data processor 103, the wireless communication interface 105, and the storage 106 are separate constituent elements, but this configuration is not limiting. The controller 101 may be configured to be capable of executing a portion or all of the functions of other constituent elements (such as the logical data processor 103). The same holds for other load elements 70 (the radio device 400 or the like), the energy harvesting element 60, the secondary battery element 80, the switching element 90, and the like.

In the present embodiment (power wiring network apparatus 1), all of the circuit elements include the logical data processor 103, 203, 503 and have a data transmission and reception function, but this configuration is not limiting. It suffices for at least some of the energy harvesting elements 60 and load elements 70 connected to the power line to be capable of power line communication.

In the present embodiment (power wiring network apparatus 1), the load element 70 (network management device 100) includes the wireless communication interface 105, but this configuration is not limiting. The load element 70 may be configured not to include the wireless communication interface 105. The wireless communication interface 105 is not limited to Bluetooth or Wi-Fi and may support wireless communication via a base station.

INDUSTRIAL APPLICABILITY

The present disclosure can provide a power wiring network apparatus 1 capable of constructing a power network with excellent portability, without the need to maintain infrastructure.

REFERENCE SIGNS LIST

1 Power wiring network apparatus
10 Energy harvesting unit
11 Front surface
12 Back surface
13 Edge
16 Solar cell panel
17 Extraction electrode
17a First extraction electrode
17b Second extraction electrode
20 Connector
20a First connector
20b Second connector
21 Connecting portion
30 Rigid member
31 Front surface
32 Back surface
40 Conductive portion
50 Connection cable
51 External connector
51a First external connector
51b Second external connector
52 Conductive member
60, 60a, 60b Energy harvesting element
63 Reverse current prevention unit
64 Connector for power generator connection
65 External energy harvesting unit
66 Connector
70, 70a, 70b Load element
72 Load
73 Voltage controller
74 Connector for load connection
75 External load
76 Connector
80 Secondary battery element
82 Secondary battery
83 Switch
84 Voltage controller
85 Reverse current prevention unit
90 Switching element
93 Switch
100 Network management device
101 Controller
103 Logical data processor
105 Wireless communication interface
106 Storage
107 ROM
108 RAM
109 Flash ROM
110 Transmission/reception data processor
111 Device attribute information generation unit
112 Command information generation unit
113 Status information generation unit
115 Transmission data generation unit
116 Received data storage
117 Received data analyzer
118 Device control information generation unit
120 Data transmitter (second transmitter)
121 Transmission data modulator
122 Signal level adjuster
130 Timing generator
132 Modulation frequency generator
134 Divider
140 Data receiver (receiver)
141 Signal level adjuster
142 Received data demodulator
150 Synchronization signal generation unit
151 Synchronization signal generator
152 Signal level adjuster
170 Filter
200 Energy harvesting device
201 Power generator 203 Logical data processor
210 Transmission/reception data processor
211 Device attribute information generation unit
212 Command information generation unit
213 Status information generation unit
216 Received data storage
217 Received data analyzer
218 Device control information generation unit
220 Data transmitter (first transmitter)
221 Transmission data modulator
222 Signal level adjuster
230 Timing generator
231 Signal level adjuster
232 Synchronization signal detector
233 Voltage-controlled oscillator
234 Divider
235 Phase comparator
236 Low pass filter
240 Data receiver
241 Signal level adjuster
242 Received data demodulator
270 Filter
300 Secondary battery device
301 Battery unit
400 Radio device
401 Radio
500 Interruption/conduction device
501 Controller
503 Logical data processor
505 I/O processor
506 Storage
507 ROM
508 RAM
510 Transmission/reception data processor
511 Device attribute information generation unit
512 Command information generation unit
513 Status information generation unit
515 Transmission data generation unit
516 Received data storage
517 Received data analyzer
518 Device control information generation unit
520 Data transmitter (second transmitter)
521 Transmission data modulator
522 Signal level adjuster
530 Timing generator
540 Data receiver
541 Signal level adjuster
542 Received data demodulator
570 Filter
700 External device
A First direction
B Second direction
C Thickness direction
S1, S2, S3, S4 Synchronization signal
T1 Thickness of energy harvesting unit
T2 Thickness of connector
T3 Thickness of rigid member

The invention claimed is:

1. A power wiring network apparatus comprising:
a plurality of circuit elements each comprising a first connector, a second connector, and a conductive portion electrically connecting the first connector and the second connector in a manner capable of supplying power;
when the first connector and the second connector are viewed in plan view of each circuit element so that the first connector and the second connector are aligned in the left-right direction, the first connector is located on upper part of the left side edge and the second connector is located on upper part of the right side edge, wherein the first connector and the second connector are separated in the left-right direction and are located in line symmetrical positions with respect to a central axis of the circuit element,
wherein the plurality of circuit elements comprises
an energy harvesting element as a circuit element capable of outputting, from the first connector and/or the second connector, power generated by energy harvesting; and
a load element as a circuit element capable of consuming power inputted from the first connector and/or the second connector;
wherein the plurality of circuit elements are mechanically and electrically attachable and detachable via the first connector and the second connector;
wherein the energy harvesting element outputs power generated by energy harvesting from the first connector and/or the second connector via a reverse current prevention unit, and communication data for power line data communication is input into/output from a logical data processor connected in parallel with the reverse current prevention unit via the first connector and/or the second connector; and
wherein at least some of the energy harvesting element and the load element are capable of power line data communication via a power line including the first connector, the second connector, and the conductive portion.

2. The power wiring network apparatus of claim 1, wherein the energy harvesting element comprises a first transmitter configured to transmit data via the first connector and/or the second connector.

3. The power wiring network apparatus of claim 2, wherein the first transmitter or a second transmitter is capable of transmitting a signal yielded by digital modulation of transmission data to another circuit element by superimposing the signal on the power line via the first connector and/or the second connector.

4. The power wiring network apparatus of claim 3, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

5. The power wiring network apparatus of claim 2, wherein at least one load element comprises a second transmitter configured to transmit data via the first connector and/or the second connector and/or comprises a receiver configured to receive data.

6. The power wiring network apparatus of claim 2, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

7. The power wiring network apparatus of claim 1, wherein at least one load element comprises a second transmitter configured to transmit data via the first connector and/or the second connector and/or comprises a receiver configured to receive data.

8. The power wiring network apparatus of claim 7, wherein the receiver is configured to receive, via the first connector and/or the second connector, a signal yielded by digital modulation and superimposed on the power line and is configured to demodulate the signal and generate received data.

9. The power wiring network apparatus of claim 8, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

10. The power wiring network apparatus of claim 7, wherein the first transmitter or the second transmitter is capable of transmitting a signal yielded by digital modulation of transmission data to another circuit element by superimposing the signal on the power line via the first connector and/or the second connector.

11. The power wiring network apparatus of claim 7, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

12. The power wiring network apparatus of claim 1, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

13. The power wiring network apparatus of claim 12, wherein the energy harvesting element or the load element is configured to receive the synchronization signal and to transmit the notification signal of the energy harvesting element or the load element to another circuit element during a predetermined period based on the synchronization signal when the energy harvesting element or the load element detects no signal during the predetermined period.

14. The power wiring network apparatus of claim 13, wherein the notification signal includes attribute data of the energy harvesting element or the load element, and the attribute data is fixed length modulation data.

15. The power wiring network apparatus of claim 12, wherein the notification signal includes attribute data of the energy harvesting element or the load element, and the attribute data is fixed length modulation data.

16. The power wiring network apparatus of claim 12, wherein the load element capable of generating the synchronization signal is further capable of wireless communication by Bluetooth.

17. The power wiring network apparatus of claim 1, wherein at least one load element is configured to transmit variable length data including control information of the energy harvesting element or the load element.

18. The power wiring network apparatus of claim 1, wherein at least one energy harvesting element or load element is configured to transmit variable length data including status information of the at least one energy harvesting element or load element.

19. The power wiring network apparatus of claim 1, wherein the circuit elements include a switching element capable of switching between electrical connection to and disconnection from another plurality of circuit elements.

20. The power wiring network apparatus of claim 19, wherein the switching element comprises a second transmitter configured to transmit data and/or a receiver configured to receive data.

* * * * *